(12) United States Patent
Okamoto et al.

(10) Patent No.: US 9,360,046 B2
(45) Date of Patent: Jun. 7, 2016

(54) MULTIPLE ROW COMBINATION BALL BEARING

(75) Inventors: Shin Okamoto, Kanagawa (JP); Yoshiaki Katsuno, Kanagawa (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 13/581,950

(22) PCT Filed: Jan. 17, 2012

(86) PCT No.: PCT/JP2012/050854
§ 371 (c)(1),
(2), (4) Date: Aug. 30, 2012

(87) PCT Pub. No.: WO2012/114790
PCT Pub. Date: Aug. 30, 2012

(65) Prior Publication Data
US 2013/0004107 A1    Jan. 3, 2013

(30) Foreign Application Priority Data

Feb. 25, 2011 (JP) .................. 2011-040056
Feb. 25, 2011 (JP) .................. 2011-040057
Jun. 9, 2011 (JP) .................. 2011-129271
Jun. 9, 2011 (JP) .................. 2011-129272

(51) Int. Cl.
*F16C 33/60* (2006.01)
*F16C 19/54* (2006.01)
(Continued)

(52) U.S. Cl.
CPC ............. *F16C 19/541* (2013.01); *F16C 19/163* (2013.01); *F16C 33/58* (2013.01); *F16C 2240/34* (2013.01)

(58) Field of Classification Search
CPC ........ F16C 19/14; F16C 19/16; F16C 19/163; F16C 19/181; F16C 19/182; F16C 19/54; F16C 19/541; F16C 19/542; F16C 2240/34; F16C 33/58

USPC ......... 384/445, 452, 453, 490, 504, 512, 513, 384/613
See application file for complete search history.

(56) References Cited

U.S. PATENT DOCUMENTS 4,730,995 A * 3/1988 Dewhirst .................. 384/517
5,411,388 A * 5/1995 Soderlund .................. 384/517
(Continued)

FOREIGN PATENT DOCUMENTS

JP  2007-285367 A  11/2007
JP  2008-101711 A   5/2008
JP  2010-001924 A   1/2010

OTHER PUBLICATIONS

Bearing Manual Cyclopedia, vol. 2, No. 104, 1981, p. 1112.*
(Continued)

*Primary Examiner* — James Pilkington
(74) *Attorney, Agent, or Firm* — Sughrue Mion, PLLC

(57) ABSTRACT

A multiple row combination ball bearing 10 includes at least two rows of ball bearings 11A and 11B. A counterbore 12d is formed on a groove shoulder 12c of an outer ring 12 of the respective ball bearings 11A and 11B. The respective ball bearings 11A and 11B have an inner and outer diameter dimension and a width dimension corresponding to a standard bearing of the ISO standard. An extension line L of a contact angle α of the ball bearing 11A passes through an axial direction end plane 12e of the ball bearing 11B which is adjacent to the ball bearing 11A at one side in the axial direction. The extension line L of the contact angle α of the adjacent ball bearing 11B passes through the axial direction end plane 13e of the ball bearing 11A.

8 Claims, 17 Drawing Sheets

(51) Int. Cl.
*F16C 19/16* (2006.01)
*F16C 33/58* (2006.01)

(56) References Cited

U.S. PATENT DOCUMENTS

| | | | | |
|---|---|---|---|---|
| 5,655,844 | A * | 8/1997 | Takano | 384/453 |
| 7,104,772 | B2 * | 9/2006 | Tsuboi | 384/504 |
| 7,401,982 | B2 * | 7/2008 | Thompson | 384/613 |
| 7,918,606 | B2 * | 4/2011 | Akamatsu et al. | 384/462 |
| 2009/0034895 | A1 * | 2/2009 | Zlipko et al. | 384/513 |
| 2009/0131235 | A1 * | 5/2009 | Katsuno et al. | 384/512 |

OTHER PUBLICATIONS

International Search Report (PCT/ISA/210) dated Apr. 17, 2012, issued by the International Searching Authority in International Application No. PCT/JP2012/050854.
Written Opinion (PCT/ISA/237) dated Apr. 17, 2012, issued by the International Searching Authority in International Application No. PCT/JP2012/050854.
English translation of the International Search Report dated Apr. 17, 2012 issued by the International Searching Authority in International Application No. PCT/JP2012/050854.

* cited by examiner

MULTIPLE ROW COMBINATION BALL BEARING

TECHNICAL FIELD

The present invention relates to a multiple row combination ball bearing and particularly to a multiple row combination ball bearing adaptable for use in bearing a larger thrust load compared to a radial load, for example, for use in rotating while bearing a large load in an axial direction such as a ball screw support roller bearing for an electric injection molding machines, a ball screw support roller bearing for die casting machines or a ball screw support roller bearing for electric servo press machines.

BACKGROUND ART

As a method of manufacturing plastic goods, a method of injection molding is commonly used. In injection molding, in a case where a molding material is a thermoplastic resin such as polyamide (PA), polyphenylene sulphide (PPS), polyether ether ketone (PEEK) or the like, with respect to a plastic heated at a softening temperature (generally 180° C. to 450° C.), an injection pressure is applied and a metal die is filled to form the mold. The molding process is called "mold clamping" since maintaining an inner pressure of the die is necessary until the plastic filling the die has solidified.

In the mold clamping of the injection molding machine in the related art, as a method of applying a mold clamping force, a cylinder drive method using a hydraulic control has mainly been used. However, in recent years, without using a large amount of oil, a ball screw drive method by an electric servo control using a high torque motor which is environmentally friendly and excellent in energy saving performance has been developed and put into practical use.

FIGS. 17 and 18 illustrate an electric injection molding machine 101, which includes a mold clamping unit 102 and an injection unit 103. The mold clamping unit 102 has a rear platen 104, a movable platen 105 and a fixing platen 106, and performs opening and closing of the molding die and the mold clamping through a mold clamping mechanism 108 where a molding die 107 placed between the movable platen 105 and the fixing platen 106 is placed between the rear platen 104 and the movable platen 105.

The mold clamping mechanism 108 has a toggle structure and if a mold clamping ball screw 110 pivotally supported on the rear platen 104 is driven to turn by a mold clamping motor 109, a cross head 111 moving back and forth, is expanded and contracted. As a result, the movable platen 105 is moved back and forth. The mold clamping ball screw 110 is pivotally supported on the rear platen 104 by a support bearing 112.

In addition, the movable platen 105 has a drive mechanism 141 which drives an ejector pin 140 in order to thrust out a product from the molding die 107 after die forming. The drive mechanism 141 has a motor and a ball screw, and rotates an ejector axis 142 forming a screw axis of the ball screw so as to move the ejector pin 140. The ejector axis ball screw is pivotally supported on the movable platen 105 by a support bearing (not illustrated).

The injection unit 103 has a rear plate 113, a movable plate 114 and a front plate 115. A proximal portion of a measurement/injection screw 117 placed in a cylinder assembly 116 of the front plate 115 is pivotally supported on a front surface of the movable plate 114 (mold clamping unit side) via a support bearing 118 (screw sleeve). The measurement/injection screw 117 measures a resin for molding and during melting and kneading, is rotated to turn by a metering motor (not illustrated) attached to the movable plate 114.

As also illustrated in FIG. 5, the movable plate 114 has additionally a ball nut 120 fixed to a rear surface thereof and an injection ball screw 121 screwed thereto is pivotally supported on the rear plate 113, thereby configuring an injection mechanism 122. The injection ball screw 121 is pivotally supported on the rear plate 113 by a support bearing 123 and in addition, is driven by an injection motor 124 attached to the rear plate 113.

If the injection motor 124 is driven in forward direction, the injection ball screw 121 is subject to a positive rotation. Then, the movable plate 114 moves forward and a molten resin inside the cylinder assembly 116 is injected into the molding die 107 by the injection/measurement screw 117. Upon injection, the measurement motor is driven, the injection/measurement screw 117 is rotated and the resin is newly subject to measuring and mixing. At this time, the injection/measurement screw 117 retreats, being pressed by a pressure of the resin fed thereinto. However, a back pressure is exerted by the injection motor 124 such that the mixing and the melting are sufficiently performed. In a stage after completing the measurement, in order to prevent a leakage from a nozzle's tip end, the injection motor 124 is in reverse rotation, the injection/measurement screw 117 is slightly retreated and a sack back is performed.

In addition, the injection unit 103 has a nozzle touch mechanism 153 which brings a ball screw 151 to be in positive rotation or reverse rotation using a drive motor 150 and makes the cylinder assembly 116 proceed back and forth to the fixing platen 106. The nozzle touch mechanism 153 presses a nozzle 116a on a tip end attached to the cylinder assembly 116, using a predetermined force, to the molding die 107 attached to the fixing platen 106. The nozzle touch ball screw 151 is pivotally supported by a support bearing (not illustrated).

Here, in the injection molding machine using an electric servo control, the above described mold clamping ball screw support bearing 112, an ejector axis ball screw support bearing, an injection ball screw support bearing 123 and a nozzle touch ball screw support bearing undertake a large axial load during a rotation support of the ball screw, mold clamping and the like. Accordingly, a specifically dedicated ball screw support bearing using a large diameter ball as illustrated in FIG. 6 comes to be used.

In addition, in a ball screw device disclosed in PTL 1, a multiple row combination ball bearing which supports a screw axis of a ball screw adaptable for the electric injection molding machine is disclosed in that a load carrying capacity of a thrust load is greatly secured by setting a contact angle to be more than or equal to 40 degrees and less than or equal to 65 degrees.

CITATION LIST

Patent Literature

[PTL 1] JP-A-2008-101711

SUMMARY OF INVENTION

Technical Problem

By the way, as a ball screw support unit adaptable for each axis of the injection molding machine, a standard ball screw support angular contact ball bearing 200 is used, as illustrated in FIGS. 19A and 19B, which is mainly used in a feed mechanism of a bed on which a headstock or a workpiece of machine tools is mounted. The angular contact ball bearing 200 undertakes an axial load of the ball screw generated due to a broaching load during a process. Even in that case, in order to be able to satisfy a rolling contact fatigue life of the bearing, a specification is made so that a contact angle is complied with a load direction as much as possible. Generally, the contact angle is set to be 60 degrees. In a case of a tandem duplex using the bearings which have the same contact angle as each other by juxtaposing the neighboring bearings, as illustrated in FIG. 19A, an extension line L of a normal line of the contact angle is not generally included inside an axial direction end plane 201 of the adjacent bearing 200. In addition, as illustrated in FIG. 19B, even in a case of considering an osculating ellipse C of a ball and a raceway groove, the extension lines La and Lb connecting radial direction end points a and b of the osculating ellipse C inside each raceway groove from a ball center are not generally included inside an axial direction end plane 201 of the adjacent bearing 200. Such angular contact ball bearing is designed in consideration of the rolling contact fatigue life. In a case of applying to the machine tools, a bearing ring rarely undertakes such an extremely large load as to cause damage due to bending of the bearing ring. Accordingly, even though a specification allows such tandem duplex, no problems have occurred.

On the other hand, accompanied by motorization of the injection molding machine or the like which use hydraulic pressure, there has emerged a use for bearing a large thrust load which is unexpected in a commonly used ball screw support angular contact ball bearing. For that reason, if the large thrust load acts, a groove portion of the bearing ring undertakes an intensive load and thus there is a probability of malfunction such as a fractured bearing ring or the like.

In addition, in the use of the injection molding machine, in order to satisfy the fatigue life of the bearing with respect to the large load, so as to undertake the load in one direction, there are a lot of cases to adopt four to five rows of the multiple row combination ball bearing which was rarely used in the related art. Accordingly, there may be also a lot of spots subject to the occurrence of malfunctions.

Solution to Problem

The present invention, in consideration of the above described problems, is intended to provide a multiple row combination ball bearing capable of preventing a malfunction such as damage and fracture of the bearing ring, even in a case of bearing an extremely large thrust load.

Means for Solving the Problem

The above-described object can be achieved with following configuration.

(1) A multiple row combination ball bearing, comprising:
at least two rows of ball bearings arranged in a parallel combination; and
a counterbore formed on at least one side groove shoulder of an outer ring and an inner ring of each of the ball bearings,
wherein each of the ball bearings has an inner and outer diameter dimension and a width dimension corresponding to a standard bearing of the ISO standard, and
wherein an extension line of a contact angle of one of the ball bearings passes through an axial direction end plane of another one of the ball bearings which is adjacent to said one of the ball bearings at one side in an axial direction, and an extension line of the contact angle of said another one of the ball bearings passes through the axial direction end plane of said one of the ball bearings.

(2) The multiple row combination ball bearing according to the item (1),
wherein said at least two rows of the ball bearings are at least three rows of the ball bearings, and
wherein among the ball bearings, an extension line of a contact angle of an intermediate ball bearing located intermediately in the axial direction passes through an axial direction end plane of each ball bearing which is adjacent to the intermediate ball bearing at both sides in the axial direction.

(3) The multiple row combination ball bearing according to the item (1) or (2),
wherein the contact angle of the ball bearing, an inclined angle of the counterbore of the ball bearing and a ball diameter of the ball bearing are respectively set such that the extension line of the contact angle of said one of the ball bearings passes through the axial direction end plane of said another one of the ball bearings which is adjacent to said one of the ball bearings at one side in the axial direction, and the extension line of the contact angle of said another one of the ball bearings passes through the axial direction end plane of said one of the ball bearings.

(4) A multiple row combination ball bearing comprising:
at least two rows of ball bearings arranged in a parallel combination; and
a counterbore formed on at least one side groove shoulder of an outer ring and an inner ring of each of the ball bearings,
wherein each of the ball bearings has an inner and outer diameter dimension and a width dimension corresponding to a standard bearing of the ISO standard,
wherein extension lines passing through radial direction bilateral end points of an osculating ellipse inside an raceway groove of the outer ring of one of the ball bearings and a ball center of said one of the ball bearings pass through at least one of an outer circumferential surface of said one of the ball bearings and an axial direction end plane of the outer ring of another one of the ball bearings which is adjacent to said one of the ball bearings at one side in the axial direction, and
wherein extension lines passing through radial direction bilateral end points of an osculating ellipse inside an raceway groove of the inner ring of said another one of the ball bearings and a ball center of said another one of the ball bearings pass through at least one of an inner circumferential surface of the inner ring of said another one of the ball bearings and an axial direction end plane of the inner ring of said one of the ball bearings.

(5) The multiple row combination ball bearing according to the item (4),
wherein said at least two rows of the ball bearings are at least three rows of the ball bearing and,
wherein among the ball bearings, extension lines passing through radial direction bilateral end points of an osculating ellipse inside a raceway groove of the outer ring and a ball center of an intermediate ball bearing located intermediately in the axial direction pass through at least one an axial direction end plane of the outer ring of the ball bearing which is adjacent to an outer circumferential surface of the outer ring of the intermediate ball bearing at one side in the axial direction, and
wherein extension lines passing through radial direction bilateral end points of the osculating ellipse inside a raceway groove of the inner ring from the ball center of the intermediate ball bearing located intermediately in the axial direction pass through at least one of the inner circumferential of the inner ring of the intermediate ball bearing and an axial direction end plane of the inner ring of the other ball bearing which is adjacent to an inner circumferential surface of the inner ring of the intermediate ball bearing at the other side in the axial direction.

(6) The multiple row combination ball bearing according to the item (4) or (5), wherein a contact angle of the ball bearing, an inclined angle of the counterbore of the ball bearing and a ball diameter of the ball bearing are respectively set such that the extension lines passing through the radial direction bilateral end points of the osculating ellipse inside the raceway groove of the outer ring of said one of the ball bearings from the ball center of said one of the ball bearings pass through at least one of the outer circumferential surface of the outer ring of said one of the ball bearings and the axial direction end plane of the outer ring of said another one of the ball bearings which is adjacent to the outer circumferential surface of the outer ring of said one of ball bearing at one side in the axial direction, and the extension lines passing through the radial direction bilateral end points of the osculating ellipse inside the raceway groove of the inner ring of said another one of the ball bearings and the ball center of said another one of the ball bearings pass through at least one of the inner circumferential surface of the inner ring of said another one of the ball bearings and the axial direction end plane of the inner ring of said one of the ball bearings.

(7) A multiple row combination ball bearing comprising:

at least two rows of ball bearings arranged in a parallel combination; and a counterbore formed on at least one side groove shoulder of an outer ring and an inner ring of each of the ball bearings, wherein each of the ball bearings has an inner and outer diameter dimension and a width dimension corresponding to a standard bearing of the ISO standard, wherein an inner ring spacer and an outer ring spacer are provided between the adjacent ball bearings, and wherein among the ball bearings, an extension line of a contact angle of one of the ball bearings passes through one of axial direction end planes of the outer ring spacer and the inner ring spacer, and an extension line of a contact angle of the other ball bearing passes through the other of the axial direction end planes of the outer ring spacer and the inner ring spacer.

(8) The multiple row combination ball bearing according to the item (7), wherein if the adjacent ball bearings are placed without the outer ring spacer and the inner ring spacer, the extension line of the contact angle of said one of the ball bearings does not intersect with the axial direction end plane of the other ball bearing, and the extension line of the contact angle of the other ball bearing does not intersect with the axial direction end plane of said one of the ball bearings.

(9) The multiple row combination ball bearing according to the item (7) or (8), wherein at least three rows of the ball bearings are arranged in a parallel combination via the outer ring spacer and the inner ring spacer, wherein among the ball bearings, the extension line of the contact angle of an intermediate ball bearing located intermediately in the axial direction passes through the axial direction end plane of the outer ring spacer which is adjacent to the intermediate ball bearing at one side in the axial direction and the axial direction end plane of the inner ring spacer which is adjacent to the intermediate ball bearing at the other side in the axial direction.

(10) A multiple row combination ball bearing comprising:

at least two rows of ball bearings arranged in a parallel combination; and a counterbore formed on at least one side groove shoulder of an outer ring and an inner ring of each of the ball bearings, wherein each of the ball bearings has an inner and outer diameter dimension and a width dimension corresponding to a standard bearing of the ISO standard, wherein an outer ring spacer and an inner ring spacer are provided between the adjacent ball bearings, wherein among the adjacent ball bearings, extension lines passing through radial direction bilateral end points of an osculating ellipse inside a raceway groove of the outer ring of one of the ball bearings and a ball center of said one of the ball bearings pass through an axial direction end plane of the outer ring spacer, and the extension lines connecting the radial direction bilateral end points of an osculating ellipse inside a raceway groove of the inner ring of the other ball bearing and the ball center of the other ball bearing pass through the axial direction end plane of the inner ring spacer.

(11) The multiple row combination ball bearing according to the item (10), wherein if the adjacent ball bearings are placed without the outer ring spacer and the inner ring spacer, at least one of the extension lines connecting the radial direction bilateral end points of the osculating ellipse inside the raceway groove of the outer ring of said one of the ball bearings and the ball center of said one of the ball bearings does not intersect with the axial direction end plane of the other ball bearing, and wherein at least one side of the extension line connecting the radial direction bilateral end points of the osculating ellipse inside the raceway groove of the outer ring of the other ball bearing and the ball center of the other ball bearing does not intersect with the axial direction end plane of said one of the ball bearings.

(12) The multiple row combination ball bearing according to the item (10) or (11), wherein at least three rows of the ball bearing are provided via the outer ring spacer and the inner ring spacer, and wherein among the ball bearings, the extension line connecting radial direction bilateral end points of an osculating ellipse inside the raceway groove of an outer ring of an intermediate ball bearing located intermediately in the axial direction and a ball center of the intermediate ball bearing pass through the axial direction end plane of the outer ring spacer which is adjacent to the intermediate ball bearing at one side in the axial direction, and wherein the extension lines connecting radial direction bilateral end points of an osculating ellipse inside the raceway groove of the inner ring of the intermediate ball bearing and the ball center of the intermediate ball bearing pass through the axial direction end plane of the inner ring spacer which is adjacent to the intermediate ball bearing at the other side in the axial direction.

Advantageous Effects of Invention

According to the multiple row combination ball bearing of the present invention, the ball bearing has an inner and outer diameter dimension and a width dimension corresponding to a standard bearing of the ISO standard, an extension line of a contact angle of any ball bearing of the tandem duplex ball bearing passes through an axial direction end plane of the tandem duplex ball bearing which is adjacent to the ball bearing at one side in an axial direction, and the extension line of the contact angle of the adjacent ball bearing passes through the axial direction end plane of any ball bearing.

According to such a configuration, in a case where an extremely large thrust load is undertaken by the bearing, the load in a contact angle direction generated from a contact portion between a rolling element and a raceway groove of the inner and outer rings may not be undertaken only by the inner and outer rings of the bearing and the load may be backed up by the inner and outer rings of the adjacent bearing. As a result, bending stress acting on the inner and outer rings of the bearing is substantially reduced and thereby a malfunction such as damage and fracture of the bearing ring may be prevented. Accordingly, in the multiple row combination ball bearing, a load bearing threshold value may be also increased.

According to the multiple row combination ball bearing of the present invention, the ball bearing has an inner and outer diameter dimension and a width dimension corresponding to a standard bearing of the ISO standard, extension lines of each line connecting radial direction bilateral end points of the osculating ellipse inside an outer ring raceway groove from a ball center of any ball bearing of the tandem duplex ball bearings pass through at least one side of an outer circumferential surface of an outer ring of any ball bearing and an axial direction end plane of the tandem duplex ball bearing which is adjacent to the ball bearing at one side in the axial direction, and the extension lines of each line connecting radial direction bilateral end point of an osculating ellipse inside the inner ring raceway groove from a ball center of the adjacent ball bearing pass through at least one side of the inner circumferential surface of the inner ring of the adjacent ball bearing and the axial direction end plane of the inner ring of any ball bearing. According to such a configuration, in a case where an extremely large thrust load is undertaken by the bearing, the load in a contact angle direction generated from a contact portion between a rolling element and a raceway groove of the inner and outer rings may not be undertaken only by the inner and outer rings of the bearing and the load may be backed up by the inner and outer rings of the adjacent bearing. As a result, bending stress acting on the inner and outer rings of the bearing is substantially reduced and thereby a malfunction such as damage and fracture of the bearing ring may be prevented. Accordingly, in the multiple row combination ball bearing, a load bearing threshold value may be also increased.

According to the multiple row combination ball bearing of the present invention, the ball bearing has an inner and outer diameter dimension and a width dimension corresponding to a standard bearing of the ISO standard and an outer ring spacer and an inner ring spacer are placed between the adjacent tandem duplex ball bearings. Among the tandem duplex ball bearings, an extension line of a contact angle of one side ball bearings passes through one side of axial direction end planes of the outer ring spacer and the inner ring spacer, and the extension line of the contact angle of the other side ball bearing passes through the other side of the axial direction end planes of the outer ring spacer and the inner ring spacer. According to such a configuration, in a case where an extremely large thrust load is undertaken by the bearing, the load in a contact angle direction generated from a contact portion between a rolling element and a raceway groove of the inner and outer rings may not be undertaken only by the inner and outer rings of the bearing and the load may be backed up by the inner and outer rings of the adjacent bearing. As a result, bending stress acting on the inner and outer rings of the bearing is substantially reduced and thereby a malfunction such as damage and fracture of the bearing ring may be prevented. Accordingly, in the multiple row combination ball bearing, a load bearing threshold value may be also increased.

In addition, a configuration may be also made such that in a case where the adjacent tandem duplex ball bearings are placed without involving the outer ring spacer and the inner ring spacer, the extension line of the contact angle of the one side ball bearing does not cross to the axial direction end plane of the other side ball bearing, and the extension line of the contact angle of the other side ball bearing does not cross to the axial direction end plane of the other side ball bearing. As a result, the contact angle may be set to be large so as to largely undertake the load in the axial direction and thereby the rolling contact fatigue life and the prevention of damage are compatible.

According to the multiple row combination ball bearing of the present invention, the ball bearing has an inner and outer diameter dimension and a width dimension corresponding to a standard bearing of the ISO standard, among the adjacent tandem duplex ball bearings, extension lines of each line connecting radial direction bilateral end points of an osculating ellipse inside an outer ring raceway groove from a ball center of one side ball bearing pass through an axial direction end plane of the outer ring spacer, and the extension lines of each line connecting the radial direction bilateral end points of the osculating ellipse inside an inner ring raceway groove from the ball center of the other side ball bearing pass through the axial direction end plane of the inner ring spacer. According to such a configuration, in a case where an extremely large thrust load is undertaken by the bearing, the load in a contact angle direction generated from a contact portion between a rolling element and a raceway groove of the inner and outer rings may not be undertaken only by the inner and outer rings of the bearing and the load may be backed up by the inner and outer rings of the adjacent bearing. As a result, the load may be backed up by the adjacent bearing in addition to the outer ring spacer of the inner ring spacer, bending stress acting on the inner and outer rings of the bearing is substantially reduced and thereby a malfunction such as damage and fracture of the bearing ring may be prevented. Accordingly, in the multiple row combination ball bearing, a load bearing threshold value may be also increased.

In addition, a configuration may be also made that in a case where the adjacent tandem duplex ball bearings are placed without involving the outer ring spacer and the inner ring spacer, at least one side of the extension lines of each line connecting the radial direction bilateral end points of the osculating ellipse inside the outer ring raceway groove from the ball center of the one side ball bearing does not cross to the axial direction end plane of the other side ball bearing, and at least one side of the extension lines of each line connecting the radial direction bilateral end points of the osculating ellipse inside the inner ring raceway groove from the ball center of the other side ball bearings does not cross to the axial direction end plane of the one side ball bearing. As a result, the contact angle may be set to be large so as to largely undertake the load in the axial direction and thereby the rolling contact fatigue life and the prevention of damage are compatible.

DESCRIPTION OF EMBODIMENTS

Figure 17:
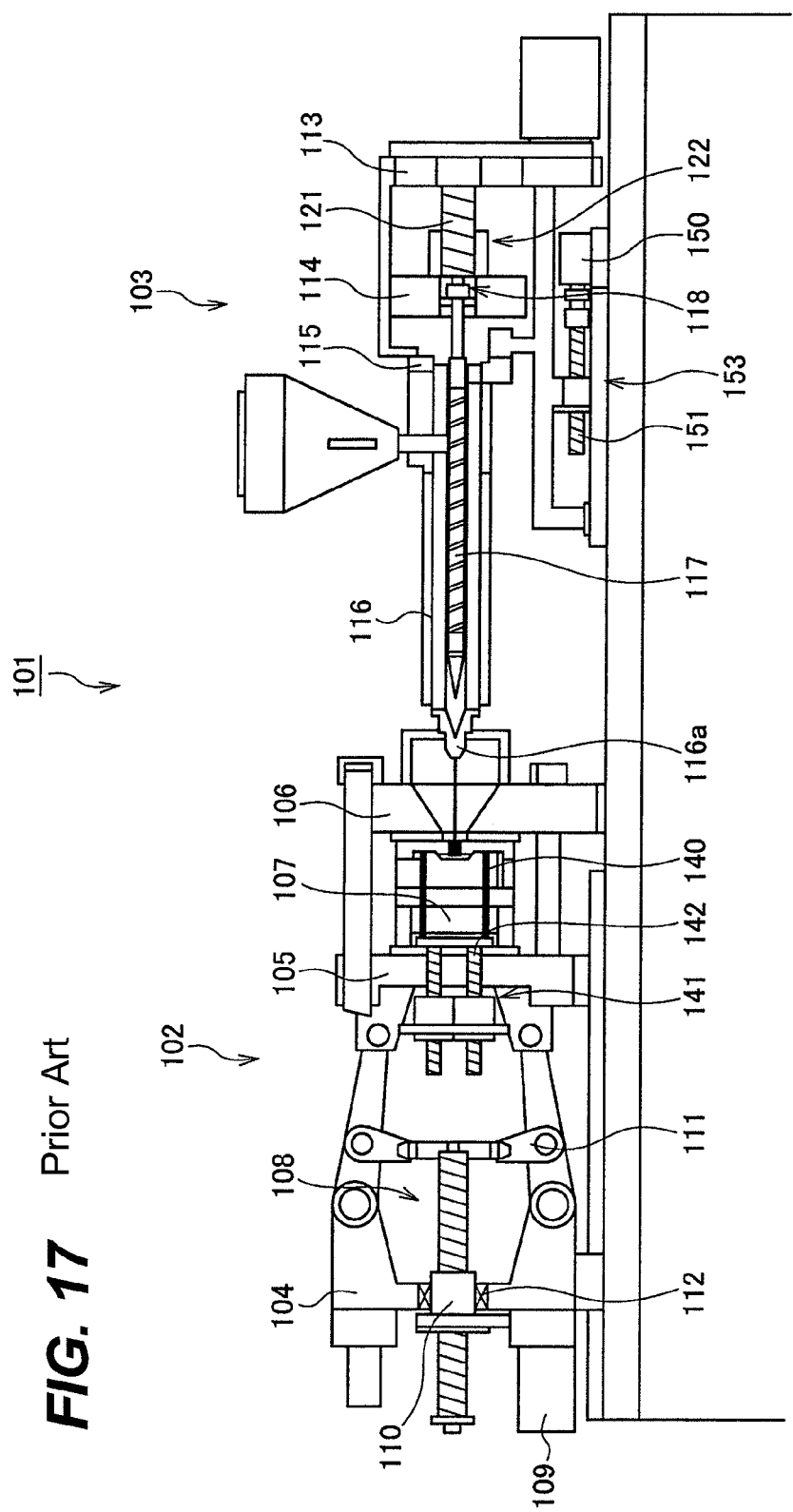
FIG. 17 is a front view of a common electric injection molding machine.
Figure 18:
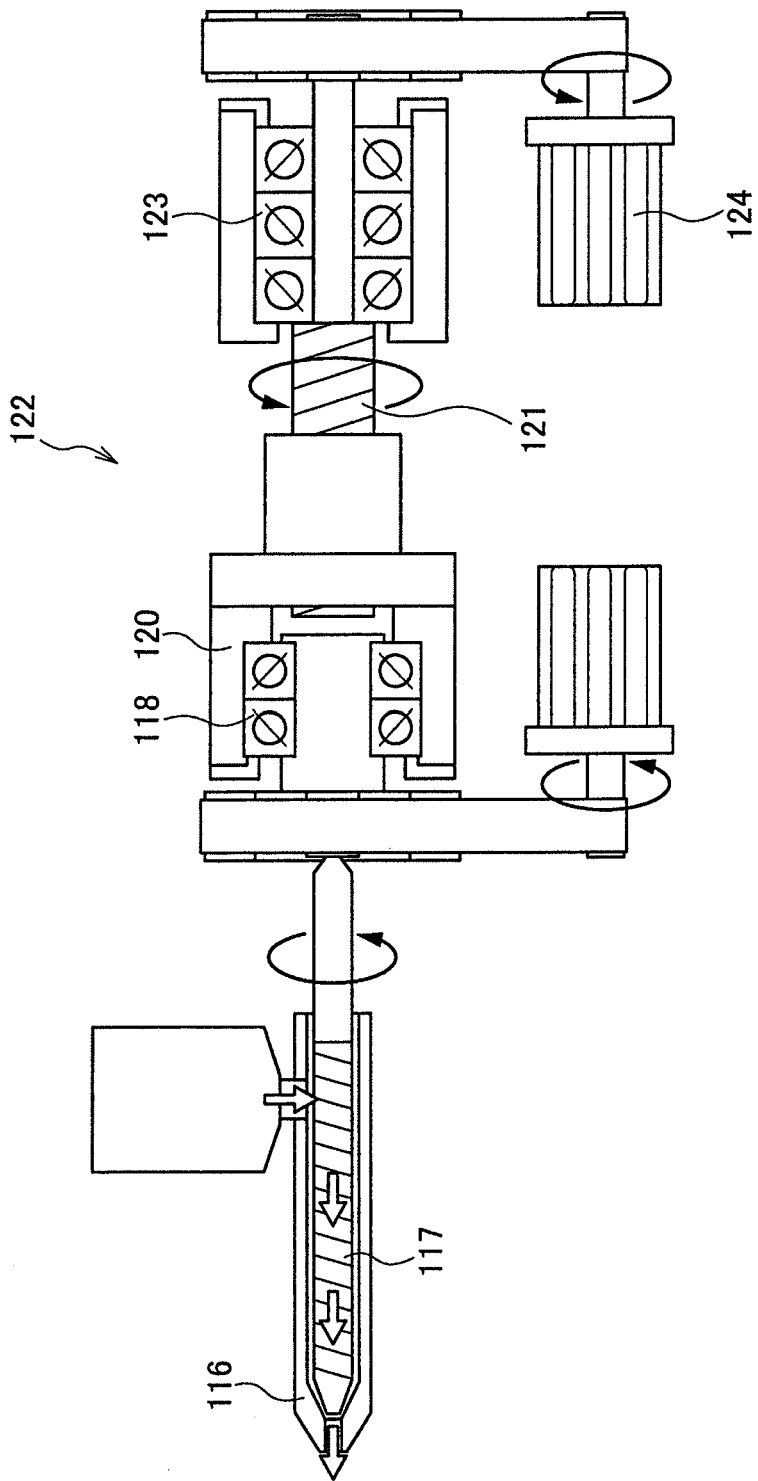
FIG. 18 is an enlarged view illustrating a main portion of a common electric injection machine.

Hereinafter, a multiple row combination ball bearing according to respective embodiments of the present invention is described in detail with reference to the drawings. In addition, the multiple row combination ball bearing according to the respective embodiments is an assembly of a mold clamping ball screw support bearing described in FIG. 17 and FIG. 18, an ejector axis ball screw support bearing, an injection ball screw support bearing and a nozzle touch ball screw support bearing. However, herein, only the multiple row combination ball bearing is illustrated for the description.

First Embodiment

Figure 1:
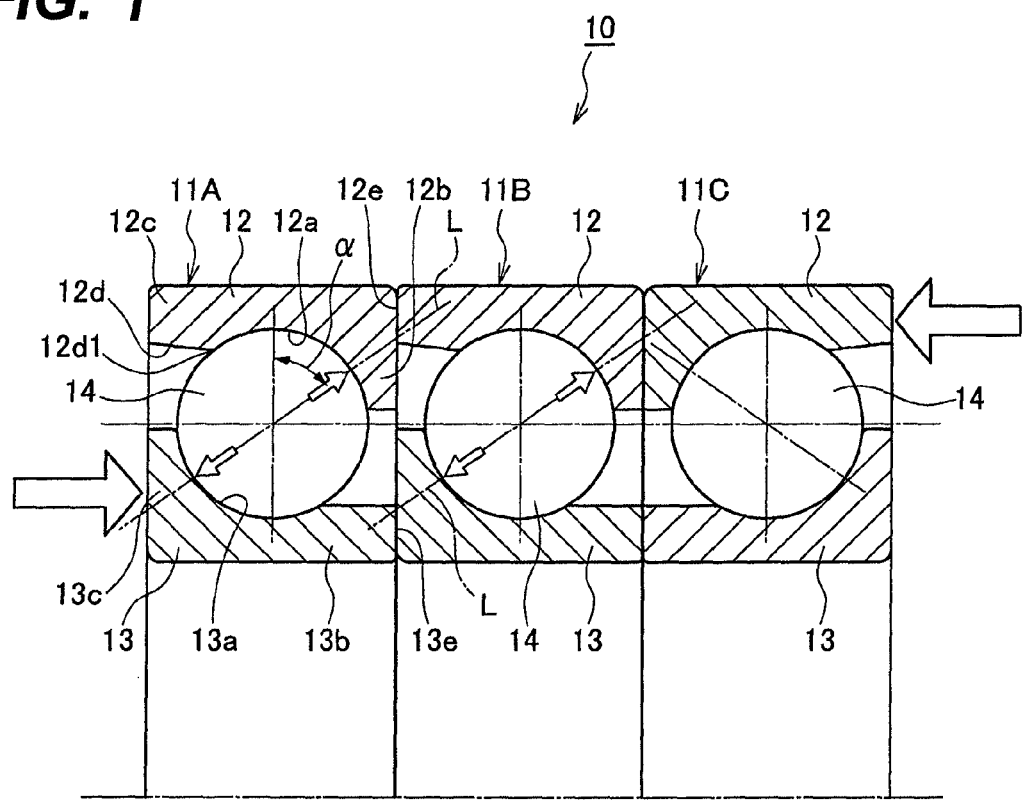
FIG. 1 is a cross sectional view of a multiple row combination ball bearing according to a first embodiment of the present invention.

As illustrated in FIG. 1, a multiple row combination ball bearing 10 includes three rows of angular contact ball bearings 11A, 11B and 11C in combination. Among them, two rows of angular contact ball bearings 11A and 11B are placed in a tandem duplex and additionally two rows of angular contact ball bearings 11B and 11C are placed in a back-to-back duplex.

Figure 4:
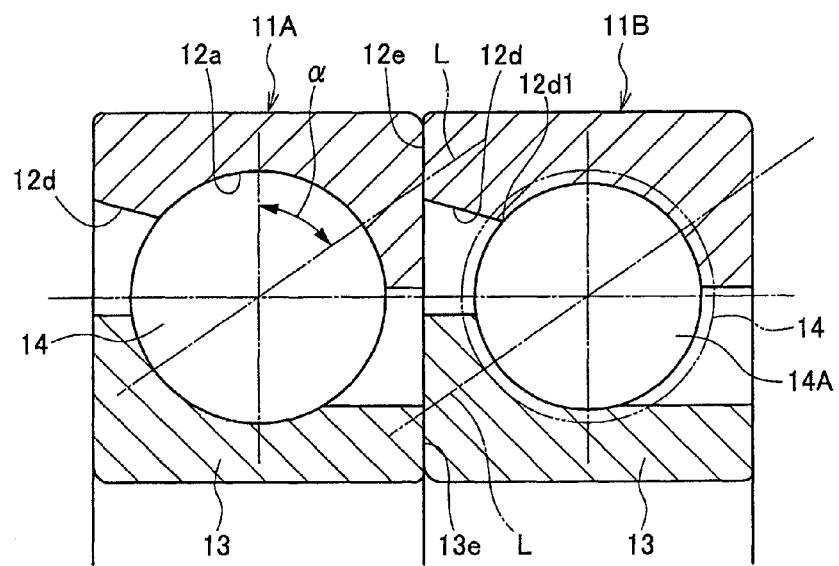
FIG. 4 is a cross sectional view of a multiple row combination ball bearing according to a modification example 2 of the present invention.
Figure 5:
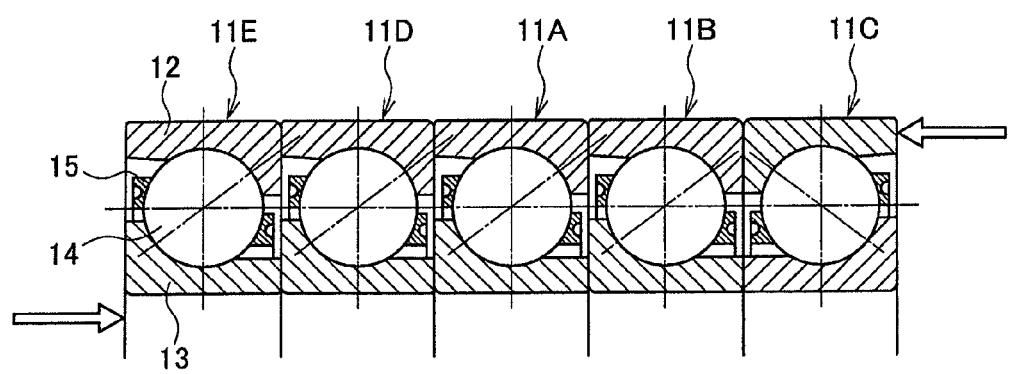
FIG. 5 is a cross sectional view illustrating another modification example of a multiple row combination ball bearing of a first embodiment.

The respective angular contact ball bearings 11A, 11B and 11C include an outer ring 12 having an outer ring raceway groove 12a on an inner circumferential surface, an inner ring 13 having an inner ring raceway groove 13a on an outer circumferential surface, a ball 14 placed movably while holding a contact angle α between the outer ring raceway groove 12a and the inner ring raceway groove 13a, and a retainer 15 (refer to FIG. 5, illustration omitted in FIGS. 1 to 4) holding the ball 14. As respective angular contact ball bearings 11A, 11B and 11C, a bearing with the inner and outer diameter dimension and width dimension corresponding to the standard bearing of the ISO standard is used.

A groove shoulder 12b of one side in an axial direction (right side in the drawing) of the outer ring 12 is formed higher than a groove shoulder 12c of the other side in the axial direction (left side in the drawing) such that the outer ring raceway groove 12a at a side through which an extension line L of the contact angle α passes with respect to a center of the ball 14 may be long. In addition, at a groove shoulder 12c of the outer ring 12 at the opposite side to the side through which the extension line L of the contact angle α with respect to a center of the ball 14 passes, a counterbore 12d inclining so as to expand a diameter toward the other side in the axial direction is formed on an inner circumferential surface. The counterbore 12d has a desired shape for inserting a ball during the assembly of the bearing. In addition, a mouth position 12d1 (boundary position between the counterbore 12d and the outer ring raceway groove 12a) of the counterbore 12d is located by determining the contact angle α in viewpoint of the ball insertion during the assembly.

In contrast, in groove shoulders 13b and 13c of the inner ring 13, the groove shoulder 13b at one side in the axial direction is formed lower in order to insert the retainer 15 having an inclined cross section to between the inner and outer rings 12 and 13. In addition, the groove shoulder 13c at the other side in the axial direction of the inner ring 13 is formed higher than the groove shoulder 13b at one side in the axial direction such that the inner ring raceway groove 13a at the side through which the extension line L of the contact angle α passes with respect to the center of the ball 14 may be long.

Here, in the two rows of the angular contact ball bearings 11A and 11B in the tandem duplex, the extension line L of the contact angle α of the left side ball bearing 11A passes through an axial direction end plane 12e of the outer ring 12 of the right side ball bearing 11B which is adjacent to the ball bearing 11A at one side in the axial direction. In addition, the extension line L of the contact angle α of the right side ball bearing 11B passes through an axial direction end plane 13e of the inner ring 13 of the left side ball bearing 11A. The present embodiment, in order to satisfy these requisites, respectively sets the contact angle α of the ball bearing 10, an inclined angle β of the counterbore 12d of the outer ring 12 and a ball diameter Da of the ball 14. In addition, in a case where the groove shoulder 13b at one side in the axial direction is symmetrical to the groove shoulder 13c at the other side in the axial direction as if they have the same shape, the inner ring 13 may not be considered in order to sufficiently secure the axial direction end plane 13e of one side groove shoulder 13b in the axial direction of the inner ring 13. However, as the present embodiment, in a case of setting the height of the groove shoulder 13b, the shape of the groove shoulder 13b may be considered because of the relation with the retainer 15.

In particular, in a case of the ball bearings 11A and 11B having a bearing inner diameter d of 25 mm to 120 mm, the contact angle α is set to be 40° to 60°, preferably 45° to 60°, the inclined angle β of the counterbore 12d is set to be 0 to 20° and the ball diameter Da is set to be 8.7 mm to 39 mm. In addition, the ratio Da/H of the ball diameter Da and the radial direction thickness H (=(bearing outer diameter−bearing inner diameter)/2) is set to be 0.5 to 0.7, and preferably 0.60 to 0.70.

Figure 2:
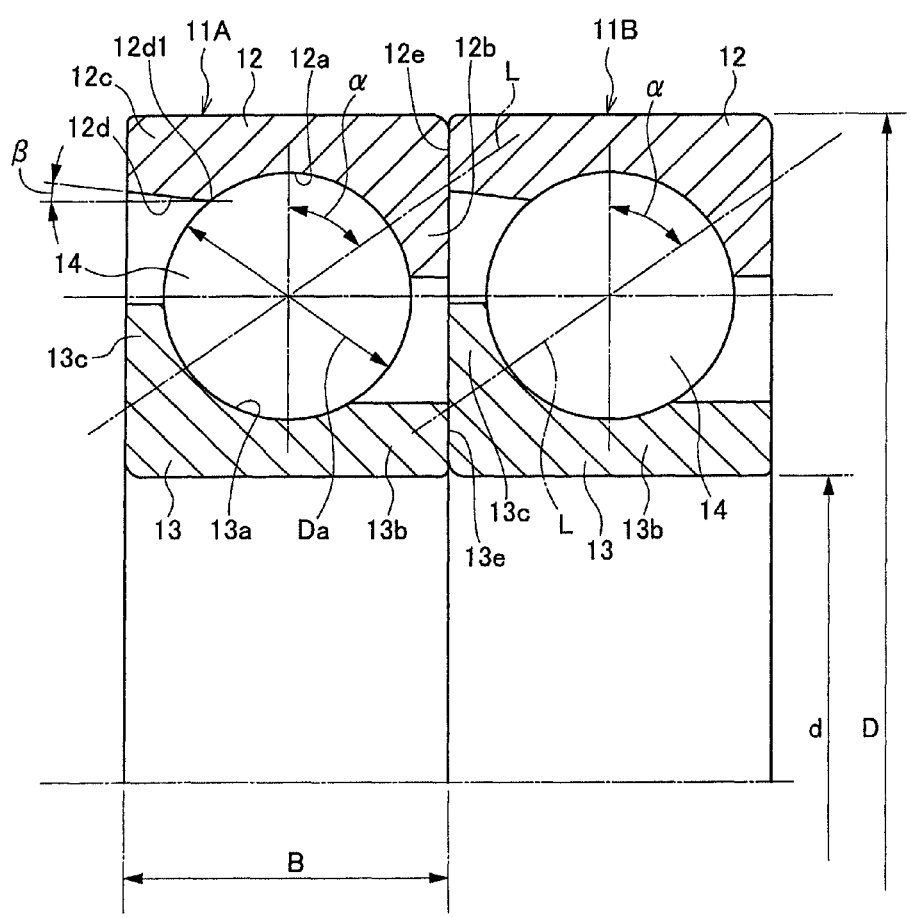
FIG. 2 is an enlarged cross sectional view illustrating a ball bearing in a tandem duplex in FIG. 1.

For example, such as illustrated in FIG. 2, in a case of the ball bearings 11A and 11B having the inner diameter d of 50 mm, the outer diameter D of 110 mm, the width B of 27 mm, the contact angle α of 55°, and the ball diameter Da of 20.638 mm, the inclined angle β of the counterbore 12d formed at the outer ring 12 is set be 5°. Therefore, the extension line L of the contact angle α of the left side ball bearing 11A passes through the axial direction end plane 12e of the outer ring 12 of the right side ball bearing 11B which is adjacent to the ball bearing 11A at one side in the axial direction. In addition, in the same manner, the groove shoulder 13b at one side in the axial direction of the inner ring 13 may also have a shape which can secure the height of the axial direction end plane 13e. Accordingly, the extension line L of the contact angle α of the right side ball bearing 11B passes through the axial direction end plane 13e of the inner ring 13 of the left side ball bearing 11A.

Through satisfying the above described requisites in this manner, when an extremely large thrust load is applied to the multiple row combination ball bearing 10, the load in the contact angle direction generated at the contact portion between the ball 14 and the raceway grooves 12a and 13a of the inner and outer rings 12 and 13 is not undertaken only by the inner and outer rings 12 and 13 of the ball bearings 11A and 11B. Thus, the load may be backed up by the inner and outer rings 12 and 13 of the adjacent ball bearings 11A and 11B. As a result, bending stress acting on the inner and outer rings of the ball bearings 11A and 11B is substantially reduced and thereby a malfunction such as damage and fracture of the bearing ring may be prevented. Accordingly, as the multiple row combination ball bearing, a load bearing threshold value may be also increased.

Modification Example 1 of First Embodiment

Figure 3:
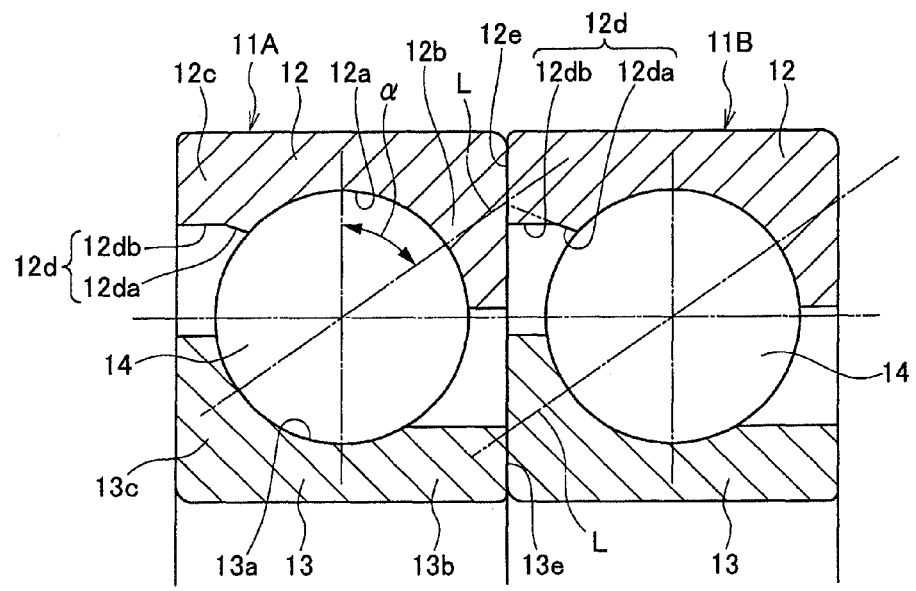
FIG. 3 is a cross sectional view of a multiple row combination ball bearing according to a modification example 1 of the present invention.

FIG. 3 illustrates two rows of the angular contact ball bearings 11A and 11B in tandem duplex according to a modification example of a first embodiment. In this case, the counterbore 12d to be formed at the outer ring 12 is formed on a taper surface 12da and a cylindrical surface 12db. For that reason, an area of the axial direction end plane 12e may be secured and the extension line L of the contact angle α of the left side ball bearing 11A is allowed to pass through the axial direction end plane 12e of the outer ring 12 of the right side ball bearing 11B which is adjacent to the ball bearing 11A at one side in the axial direction. And further, assembling performance of the bearing may be secured.

Modification Example 2 of First Embodiment

FIG. 4 illustrates two rows of the angular contact ball bearings 11A and 11B in tandem duplex according to another modification example of a first embodiment. In this case, by reducing the ball diameter of the ball bearing 14A at a side where the load of the outer ring side may be backed up, a mouth diameter of the counterbore 12d becomes decreased. Accordingly, the extension line L of the contact angle α may pass through the axial direction end plane 12e. As a result, even in a case of setting the contact angle α of the left side ball bearing 11A to be large, the backup may be available and by setting the contact angle α to be large, an effect to increase a load carrying capacity of the thrust load may be also obtained.

In addition, the multiple row combination ball bearing 10 of the first embodiment may be also adaptable to four to five rows of the multiple row combination of the ball bearings 11A to 11E, as illustrated in FIG. 5, so as to undertake a large load in one direction.

Second Embodiment

Next, the multiple row combination ball bearing 10 according to a second embodiment of the present invention is described with reference to FIG. 6 and FIG. 7. In addition, as for the part similar to the first embodiment, the same reference numerals are given to omit or simplify the description.

Figure 6:
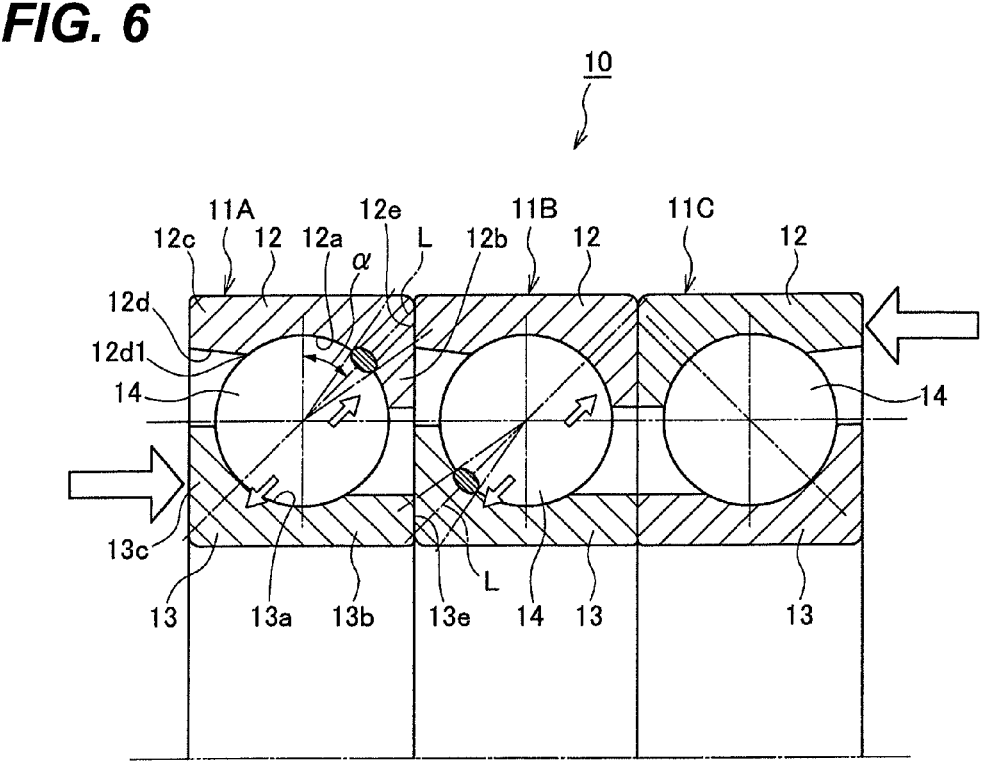
FIG. 6 is a cross sectional view of a multiple row combination ball bearing according to a second embodiment of the present invention.
Figure 7:
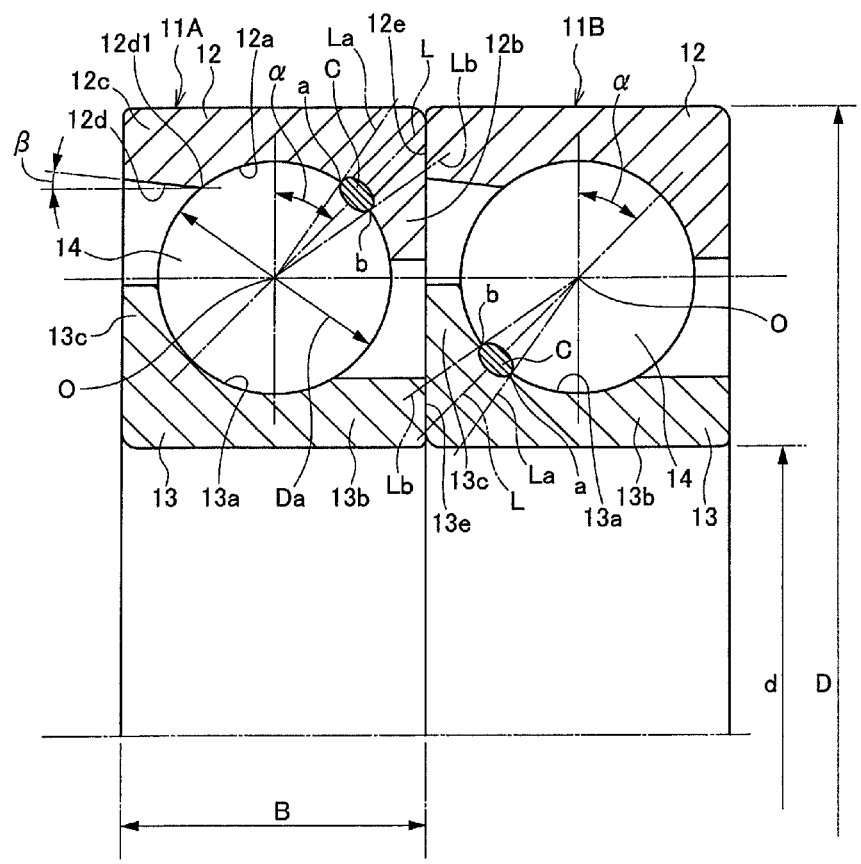
FIG. 7 is an enlarged cross sectional view illustrating a ball bearing in a tandem duplex in FIG. 6.

In the second embodiment, which has the same structure as the first embodiment, as illustrated in FIGS. 6 and 7, instead of the position through which the extension line of the contact angle of the angular contact ball bearing passes, and which is stipulated in the first embodiment, in contrast, a position through which extension line of each line connecting the radial direction bilateral end points of the osculating ellipse inside the raceway groove from the ball center is stipulated.

In other words, in two rows of the angular contact ball bearings 11A and 11B in tandem duplex, the extension lines La and Lb of each line connecting the radial direction bilateral end points a and b of the osculating ellipse C inside the outer ring raceway groove 12a from the ball center O of the left side ball bearing 11A pass through the outer circumferential surface of the outer ring 12 of the ball bearing 11A and the axial direction end plane 12e of the outer ring 12 of the right side ball bearing 11B which is adjacent to the ball bearing 11A at one side in the axial direction. In addition, the extension lines La and Lb of each line connecting the radial direction bilateral end points a and b of the osculating ellipse C inside the inner ring raceway groove 13a from the ball center O of the right side ball bearing 11B pass through the inner circumferential surface of the inner ring 13 of the right side ball bearing 11A and the axial direction end plane 13e of the inner ring 13 of the left side ball bearing 11A. The present embodiment, in order to satisfy these requisites, respectively sets the contact angle α of the ball bearing 10, the inclined angle β of the counterbore 12d of the outer ring 12 and a ball diameter Da of the ball 14. In addition, in a case where the groove shoulder 13b at one side in the axial direction is symmetrical to the groove shoulder 13c at the other side in the axial direction as if they have the same shape, the inner ring 13 may not be considered in order to sufficiently secure the axial direction end plane 13e of one side groove shoulder 13b in the axial direction of the inner ring 13. However, as the present embodiment, in a case of setting the height of the groove shoulder 13b, the shape of the groove shoulder 13b may be considered in the relation with the retainer 15.

In particular, in a case of the ball bearings 11A and 11B having a bearing inner diameter d of 25 mm to 120 mm, the contact angle α is set to be 40° to 60°, preferably 50 to 60°, the inclined angle β of the counterbore 12d is set to be 0° to 20° and the ball diameter Da is set to be 8.7 mm to 39 mm. In addition, the ratio Da/H of the ball diameter Da and the radial direction thickness H (=(bearing outer diameter−bearing inner diameter)/2) is set to be 0.5 to 0.7, preferably 0.60 to 0.70.

For example, such as illustrated in FIG. 7, in a case of the ball bearings 11A and 11B having the inner diameter d of 50 mm, outer diameter D of 110 mm, width B of 27 mm, the contact angle α of 55°, and ball diameter Da of 20.638 mm, the inclined angle β of the counterbore 12d formed at the outer ring 12 is set be 5°. Therefore, the extension lines La and Lb of each line connecting the radial direction bilateral end points a and b of the osculating ellipse C inside the outer ring raceway groove 12a from the ball center O of the left side ball bearing 11A pass through the outer circumferential surface of the outer ring 12 of the ball bearing 11A and the axial direction end plane 12e of the outer ring 12 of the right side ball bearing 11B which is adjacent to the ball bearing 11A at one side in the axial direction. In addition, in the same manner, since the groove shoulder 13b at one side in the axial direction of the inner ring 13 is also allowed to have a shape securing the height of the axial direction end plane 13e, the extension lines La and Lb of each line connecting the radial direction bilateral end points a and b of the osculating ellipse C inside the outer ring raceway groove 13a from the ball center O of the left side ball bearing 11B pass through the inner circumferential surface of the inner ring 13 of the right side ball bearing 11A and the axial direction end plane 13e of the inner ring 13 of the left side ball bearing 11A.

Through satisfying the above described requisites in this manner, similarly to the first embodiment, when an extremely large thrust load is applied to the multiple row combination ball bearing 10, the load in the contact angle direction generated at the contact portion between the ball 14 and the raceway grooves 12a and 13a of the inner and outer rings 12 and 13 is not undertaken only by the inner and outer rings 12 and 13 of the ball bearings 11A and 11B. Thus, the load may be backed up by the inner and outer rings 12 and 13 of the adjacent ball bearings 11A and 11B. As a result, bending stress acting on the inner and outer rings of the ball bearings 11A and 11B is substantially reduced and thereby a malfunction such as damage and fracture of the bearing ring may be prevented. Accordingly, as the multiple row combination ball bearing, a load bearing threshold value may be also increased.

In addition, in the present embodiment, the extension lines La and Lb of each line connecting the radial direction bilateral end points a and b of the osculating ellipse C inside the outer ring raceway groove 12a from the ball center O of the left side ball bearing 11A pass through both sides of the outer circumferential surface of the outer ring 12 of the ball bearing 11A and the axial direction end plane 12e of the outer ring 12 of the right side ball bearing 11B which is adjacent to the ball bearing 11A at one side in the axial direction, but may also pass through only the axial direction end plane 12e of the outer ring 12 of the right side ball bearing 11B. In addition, in the present embodiment, the extension lines La and Lb of each line connecting the radial direction bilateral end points a and b of the osculating ellipse C inside the inner ring raceway groove 13a from the ball center O of the right side ball bearing 11B pass through both sides of the inner circumferential surface of the inner ring 13 of the right side of the ball bearing 11A and the axial direction end plane 13e of the inner ring 13 of the left side of the ball bearing 11A, but may also pass through only the axial direction end plane 13e of the inner ring 13 of the left side of the ball bearing 11A.

The other configuration and operation are similar to those of the first embodiment.

Modification Example 1 of a Second Embodiment

Figure 8:
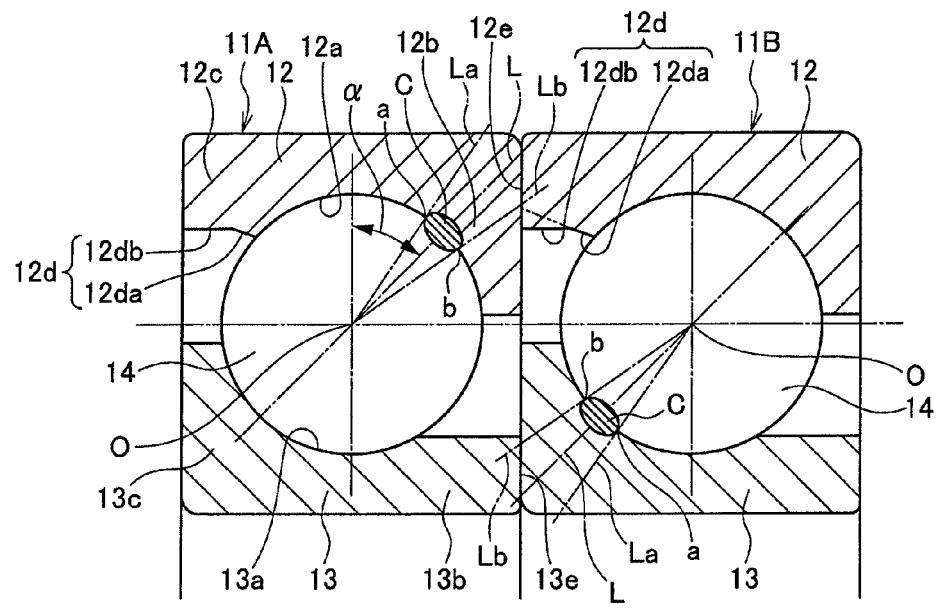
FIG. 8 is a cross sectional view of a multiple row combination ball bearing according to a modification example 1 of a second embodiment.

FIG. 8 illustrates two rows of the angular contact ball bearings 11A and 11B in tandem duplex according to a modification example of a second embodiment. In this case, the counterbore 12d to be formed at the outer ring 12 is formed on a tapered surface 12da and a cylindrical surface 12. For that reason, an area of the axial direction end plane 12e may be secured and the extension lines La and Lb of each line connecting the radial direction bilateral end points a and b of the osculating ellipse C inside the outer ring raceway groove 12a from the ball center O of the left side ball bearing 11A pass through the outer circumferential surface of the outer ring 12 of the ball bearing 11A and the axial direction end plane 12e of the outer ring 12 of the right side ball bearing 11B adjacent to the ball bearing 11A at one side in the axial direction. And further, assembling performance of the bearing may be secured.

Modification Example 2 of Second Embodiment

Figure 9:
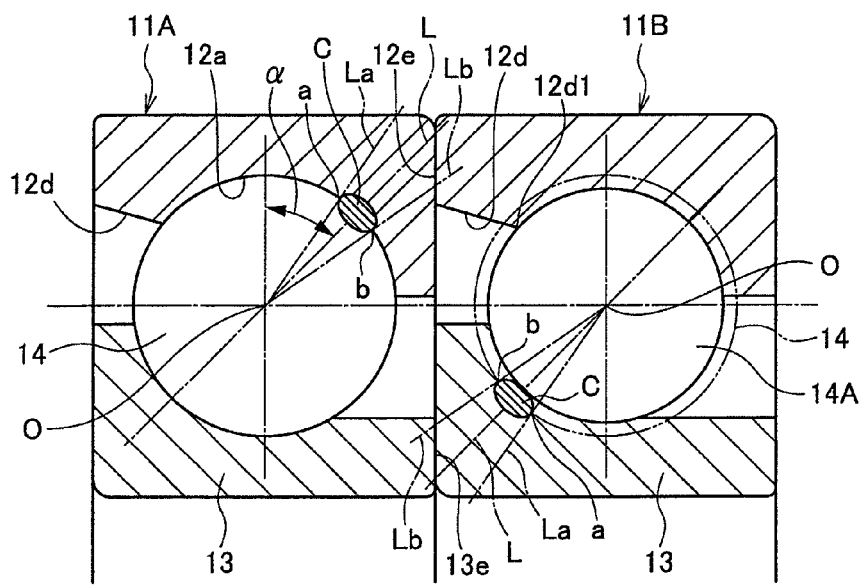
FIG. 9 is a cross sectional view of a multiple row combination ball bearing according to a modification example 2 of a second embodiment.

FIG. 9 illustrates two rows of the angular contact ball bearings 11A and 11B in tandem duplex according to another modification example of a second embodiment. In this case, by reducing the ball diameter of the ball bearing 11B at a side where the load of the outer ring side may be backed up, a mouth diameter of the counterbore 12d becomes decreased. Accordingly, the extension lines La and Lb of each line connecting the radial direction bilateral end points a and b of the osculating ellipse C inside the outer ring raceway groove 12a from the ball center O of the left side ball bearing 11A pass through the outer circumferential surface of the outer ring 12 of the ball bearing 11A and the axial direction end plane 12e of the outer ring 12 of the ball bearing 11B at the backup side. As a result, even in a case of increasing the contact angle α of the left side ball bearing 11A, the backup may be obtained and by setting the contact angle α to be large, an effect to increase a load carrying capacity of the thrust load may be also obtained.

Figure 10:
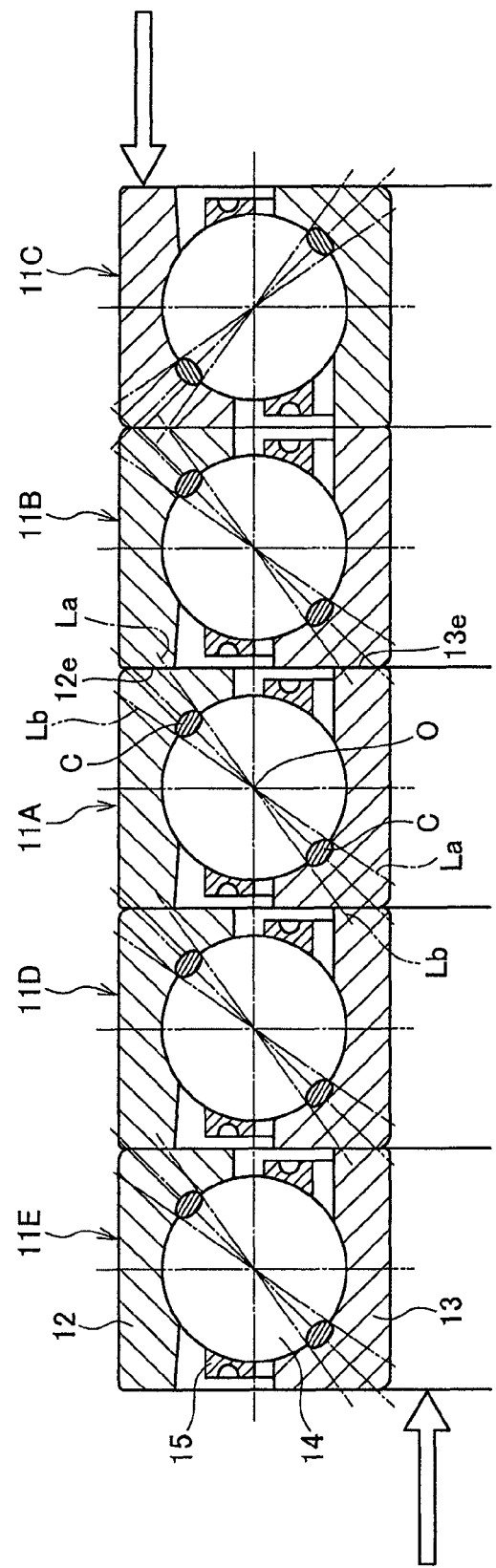
FIG. 10 is a cross sectional view illustrating another modification example of a multiple row combination ball bearing of a second embodiment.

In addition, the multiple row combination ball bearing 10 of the second embodiment may be also adaptable to four to five rows of the multiple row combination of the ball bearing 11A to 11E, as illustrated in FIG. 10, so as to undertake a large load in one direction.

In other words, the extension lines La and Lb of each line connecting the radial direction bilateral end points a and b of the osculating ellipse C inside the outer ring raceway groove 12a from the ball center O of the ball bearing 11A located intermediately in the axial direction pass through at least one side of the outer circumferential surface of the outer ring 12 of the ball bearing 11A and the axial direction end plane 12e of the outer ring 12 of the right side ball bearing 11B. In addition, the extension lines La and Lb of each line connecting the radial direction bilateral end points a and b of the osculating ellipse C inside the inner ring raceway groove 13a from the ball center O of the ball bearing 11A pass through at least one side of the inner circumferential surface of the inner ring 13 of the ball bearing 11A and the axial direction end plane 13e of the inner ring 13 of the left side ball bearing 11D.

Third Embodiment

Next, a multiple row combination ball bearing 30 according to a third embodiment of the present invention is described with reference to FIGS. 11 and 12. In addition, as for the part similar to the first embodiment, the same reference numerals are given to omit or simplify the description.

Figure 11:
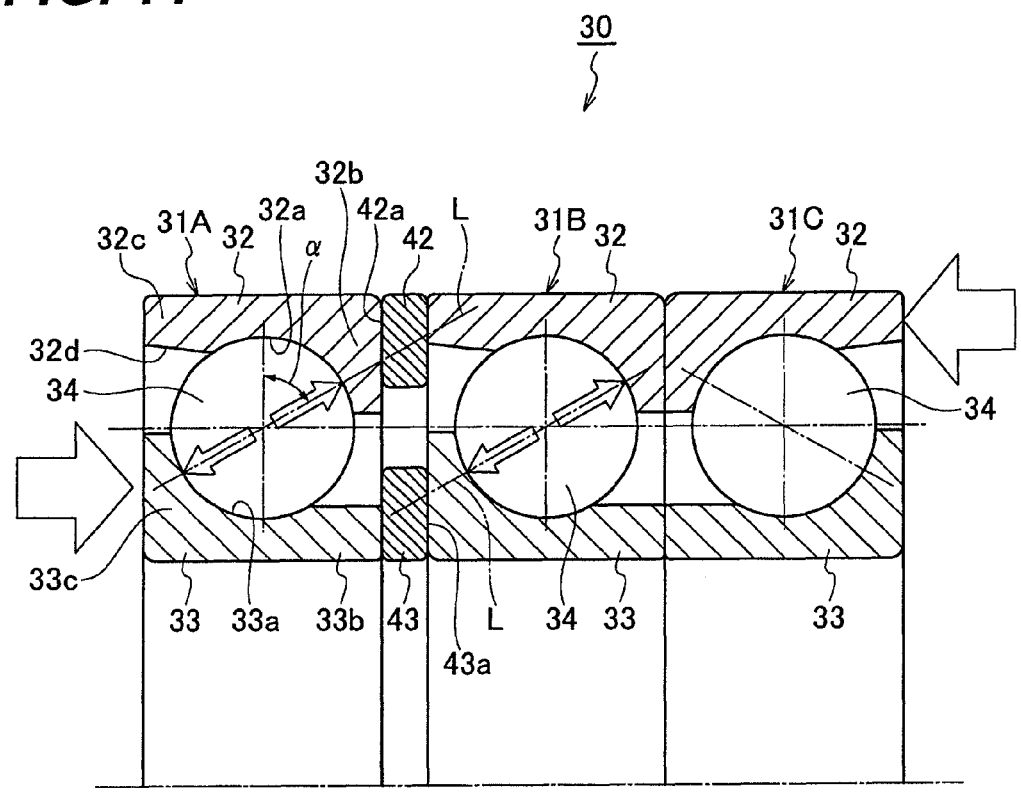
FIG. 11 is a cross sectional view of a multiple row combination ball bearing according to a third embodiment of the present invention.

As illustrated in FIG. 11, in the multiple row combination ball bearing 30, three rows of angular contact ball bearings 31A, 31B and 31C are placed in combination. Among them, two rows of the angular contact ball bearings 31A and 31B are placed in tandem duplex and additionally two rows of the angular contact ball bearings 31B and 31C are placed in back-to-back duplex.

The respective angular contact ball bearings 31A, 31B and 31C include an outer ring 32 having an outer ring raceway groove 32a on an inner circumferential surface, an inner ring 33 having an inner ring raceway groove 33a on an outer circumferential surface, a ball 34 placed movably while holding a contact angle α between the outer ring raceway groove 32a the inner ring raceway groove 33a, and a retainer (illustration omitted in the drawing) holding a ball 34. As the respective angular contact ball bearings 31A, 31B and 31C, a bearing with the inner and outer diameter dimension and width dimension corresponding to the standard bearing of the ISO standard is used.

A groove shoulder 32b of one side in an axial direction (right side in the drawing) of the outer ring 32 is formed higher than a groove shoulder 32c of the other side in the axial direction (left side in the drawing) such that the outer ring raceway groove 32a at a side through which an extension line L of the contact angle α passes with respect to a center of the ball 34 may be long. In addition, at a groove shoulder 32c of the outer ring 32 at the opposite side to the side through which the extension line L of the contact angle α with respect to a center of the ball 34 passes, a counterbore 32d inclining so as to expand a diameter toward the other side in the axial direction is formed on an inner circumferential surface. The counterbore 32d has a desired shape for inserting a ball during the assembly of the bearing. The inclined angle β of the counterbore 32d is preferably set to be from 3° to 15°. If the inclined angle β is smaller than 3°, an opening of the end face of the outer ring becomes narrow and thus the ball 34 is hard to be inserted during the assembly. In addition, when setting the inclined angle β to be equal to or less than 15°, a plane width of the axial direction end plane at the counterbore side may be secured. In addition, a mouth position 32d1 (boundary position between the counterbore 32d and the outer ring raceway groove 32a) of the counterbore 32d is located by determining the contact angle α in viewpoint of the ball insertion during the assembly.

In contrast, in groove shoulders 33b and 33c of the inner ring 33, the groove shoulder 33b at one side in the axial direction is formed lower in order to insert a retainer (not illustrated) having an inclined cross section to between the inner and outer rings 32 and 33. In addition, the groove shoulder 33c at the other side in the axial direction of the inner ring 33 is formed higher than the groove shoulder 33b at one side in the axial direction such that the inner ring raceway groove 33a at the side through which the extension line L of the contact angle α passes with respect to the center of the ball 34 may be long.

Figure 19A:
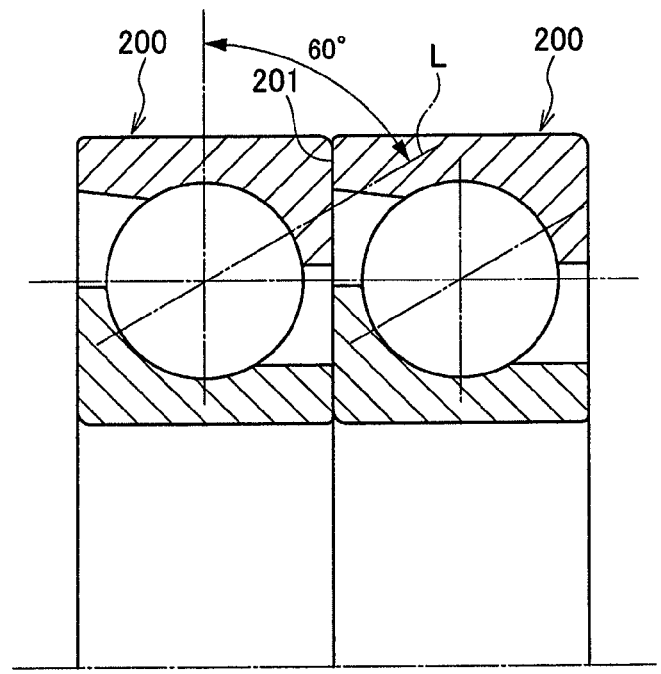
FIGS. 19A and 19B are cross sectional views of a multiple row combination ball bearing in related art.

In addition, the contact angle α of the respective ball bearings 31A, 31B and 31C is set to be equal to or more than 60°. Similarly to the ball bearing 200 in FIG. 19A, a configuration is made such that in a case where the adjacent tandem duplex ball bearings 31A and 31B are placed without involving the outer ring spacer and the inner ring spacer, the extension line L of the contact angle α of one side ball bearing 31A does not cross to the axial direction end plane 32e of the outer ring 32 of the other side ball bearing 31B, and the extension line L of the contact angle α of the other side ball bearing 31B does not cross to the axial direction end plane 33e of the inner ring 33 of the other side ball bearing 31A. That is, when each of the outer ring 32 and the inner ring 33 of the ball bearings 31A and 31B is placed by being in contact with each other, the extension line L of the contact angle α of the ball bearing 31A passes through the inner diameter side than the axial direction end plane 32e of the outer ring 32 of the ball bearing 31B. The extension line L of the contact angle α of the ball bearing 31B passes through the outer diameter side than the axial direction end plane 33e of the inner ring 33 of the ball bearing 31A. As a result, in the respective ball bearings 31A, 31B and 31C, the contact angle α is set to be large so as to largely undertake the load in the axial direction.

In addition, between the outer rings 32 and between the inner ring 33 of two rows of the angular contact ball bearings 31A and 31B in tandem duplex, an outer ring spacer 42 and an inner ring spacer 43 are respectively placed. Then, the extension line L of the contact angle α of the left side ball bearing 31A passes through the axial direction end plane 42a of the outer ring spacer 42, and the extension line L of the contact angle α of the right side ball bearing 11B passes through the axial direction end plane 43a of the inner ring spacer 43. In the present embodiment, in order to satisfy the requisites, the inner diameter dimension of the outer ring spacer 42 and the outer diameter dimension of the inner ring spacer 43 are set.

Figure 12:
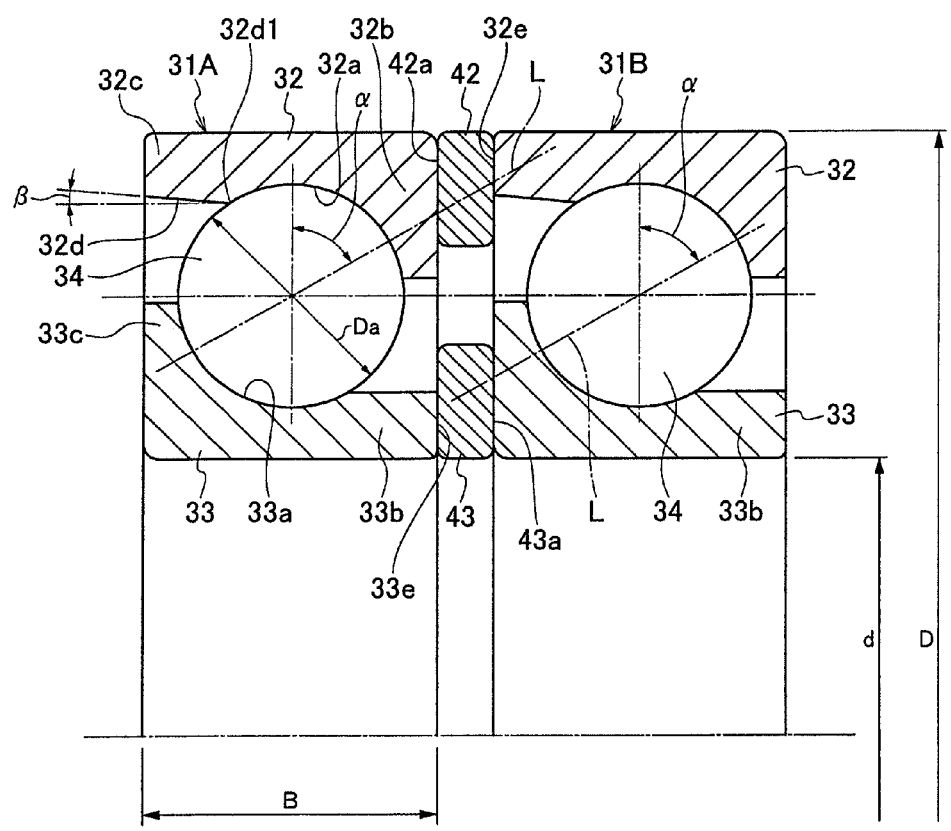
FIG. 12 is an enlarged cross sectional view illustrating a ball bearing in a tandem duplex in FIG. 1.

For example, such as illustrated in FIG. 12, in a case of the ball bearings 31A and 31B having the inner diameter d of 50 mm, the outer diameter D of 110 mm, the width B of 27 mm, the contact angle α of 60°, the ball diameter Da of 20.638 mm, and the inclined angle β of the counterbore 32d of 5°, when the ball bearings 31A and 31B are placed in order for the axial direction end planes opposing each other to be in contact with each other, the extension line L of the contact angle α of the left side ball bearing 31A does not cross to the axial direction end plane 32e of the outer ring 32 of the right side ball bearing 31B, and the extension line L of the contact angle α of the right side ball bearing 31B does not cross to the axial direction end plane 33e of the inner ring 33 of the left side ball bearing 31A. However, as in the present embodiment, by providing the outer ring spacer 42 and the inner ring spacer 43 of the width 5 mm, the extension line L of the contact angle α of the left side ball bearing 31A passes through the axial direction end plane 42a of the outer ring spacer 42, and the extension line L of the contact angle α of the right side ball bearing 31B passes through the axial direction end plane 43a of the inner ring spacer 43.

Through satisfying the above described requisites in this manner, when an extremely large thrust load is applied to the multiple row combination ball bearing 30, the load in the contact angle direction generated at the contact portion between the ball 34 and the raceway grooves 32a and 33a of the inner and outer rings 32 and 33 is not undertaken only by the inner and outer rings 32 and 33 of the ball bearing 31A and 31B. Thus, the load may be backed up by the outer ring spacer 42 and the inner ring spacer 43. As a result, in addition to the outer ring spacer 42 and the inner ring spacer 43, the load may be backed up by the adjacent ball bearings 31B and 31A. Thus, bending stress acting on the inner and outer rings of the ball bearings 31A and 31B is substantially reduced and thereby a malfunction such as damage and fracture of the bearing ring may be prevented. Accordingly, as the multiple row combination ball bearing, a load bearing threshold value may be also increased.

Furthermore, when increasing the width of the outer ring spacer 42 and the inner ring spacer 43, the extension line L of the contact angle α does not pass through the inside of the axial direction end plane of the adjacent ball bearings 31B and 31A, and comes to cross to the inner circumferential surface of a housing or the outer circumferential surface of the axis. However, in this case, the load may be backed up by these members. To increase the width of the outer ring spacer 42 and the inner ring spacer 43 does not cause a problem especially in terms of bearing the load.

Figure 13:
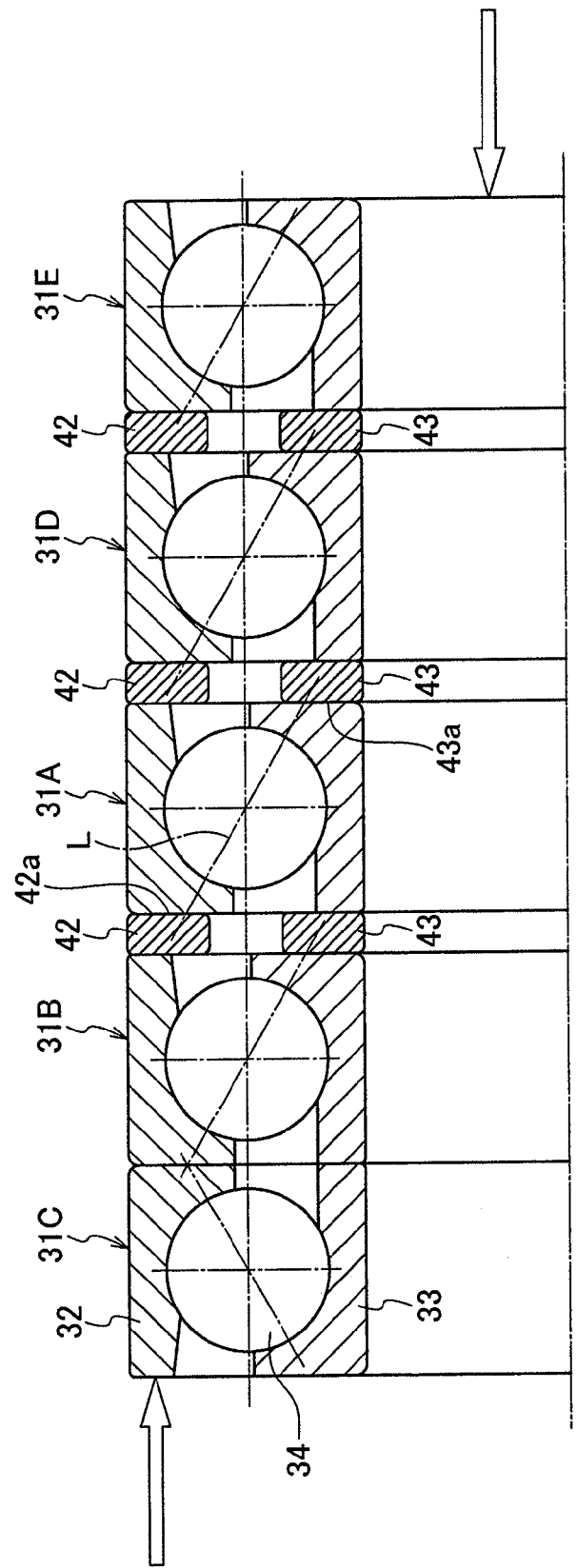
FIG. 13 is a cross sectional view illustrating a modification example of a multiple row combination ball bearing of a third embodiment.

In addition, the multiple row combination ball bearing 30 of the third embodiment may be also adaptable to four to five rows of the multiple row combination of the ball bearing 31A to 31E, as illustrated in FIG. 13, so as to undertake a large load in one direction.

In other words, four rows of the ball bearings 31B, 31A, 31D and 31E are respectively placed in tandem duplex via the outer ring spacer 42 and the inner ring spacer 43. For example, the extension line L of the contact angle α of the ball bearing 31A located intermediately in the axial direction passes through the axial direction end plane 42a of the outer ring spacer 42 which is adjacent at one side in the axial direction and the axial direction end plane 43a of the inner ring spacer 43 which is adjacent at the other side in the axial direction.

Fourth Embodiment

Next, a multiple row combination ball bearing 30 according to a fourth embodiment of the present invention is described with reference to FIGS. 14 and 15. In addition, as for the part similar to the third embodiment, the same reference numerals are given to omit or simplify the description.

Figure 14:
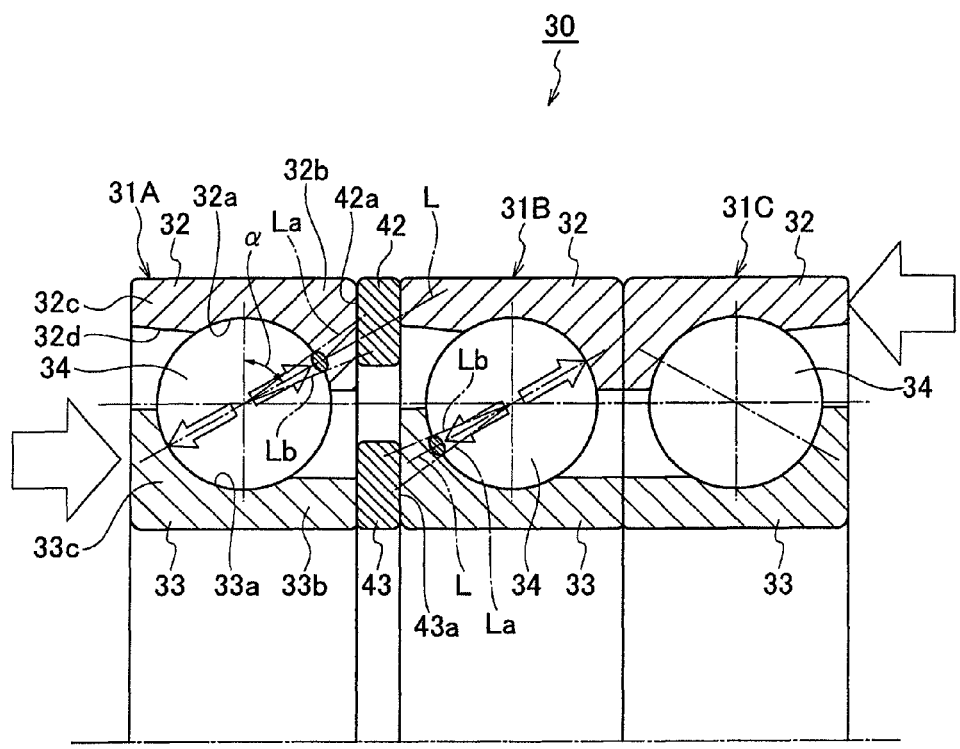
FIG. 14 is a cross sectional view of a multiple row combination ball bearing according to a fourth embodiment of the present invention.
Figure 15:
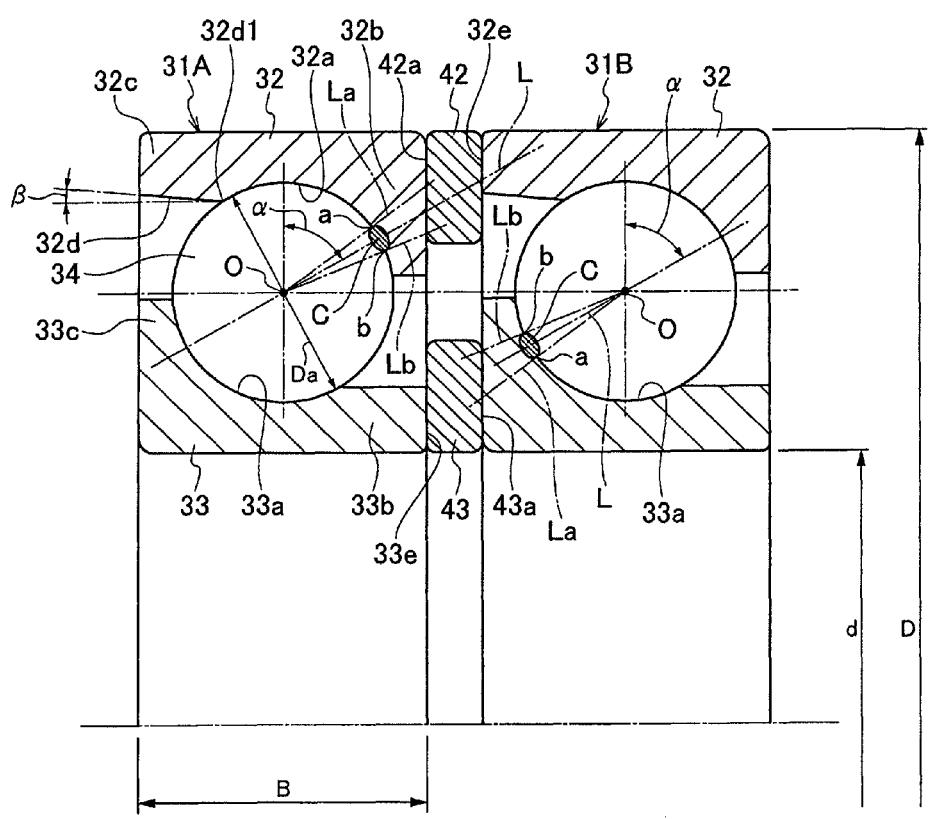
FIG. 15 is an enlarged cross sectional view illustrating a ball bearing in a tandem duplex in FIG. 14.

In the fourth embodiment, which has the same configuration as the third embodiment as illustrated in FIGS. 14 and 15, instead of the position through which the extension line of the contact angle of the angular contact ball bearing passes, which is stipulated in the third embodiment, in contrast, a position through which the extension lines of each line connecting a radial direction bilateral end point of the osculating ellipse inside the raceway groove from the ball center is stipulated.

Figure 19B:
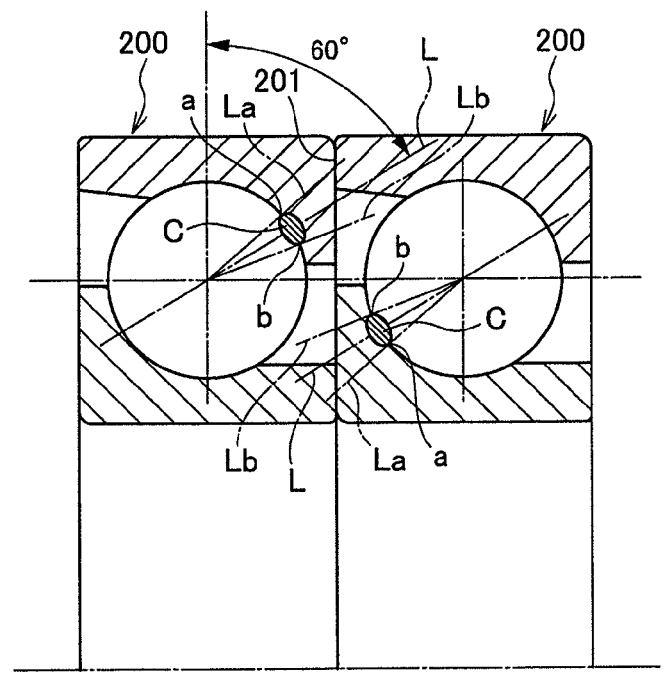

That is, the contact angle α of the respective ball bearings 31A, 31B and 31C is set to be equal to or more than 60°. Similarly to the ball bearing 200 in FIG. 19B, a configuration is made such that in a case where the adjacent tandem duplex ball bearings 31A and 31B are placed without involving the outer ring spacer and the inner ring spacer, at least one side of the extension lines La and Lb of each line connecting the radial direction bilateral end points a and b of the osculating ellipse C inside the outer ring raceway groove 32a from the ball center O of one side ball bearing 31A does not cross to the axial direction end plane 32e of the outer ring 32 of the other side ball bearing 31B, and at least one side of the extension lines La and Lb of each line connecting the radial direction bilateral end points a and b of the osculating ellipse C inside the inner ring raceway groove 33a from the ball center O of the other side ball bearing 31B does not cross to the axial direction end plane 33e of the inner ring 33 of the other side ball bearing 31A. That is, when each of the outer ring 32 and the inner ring 33 of the ball bearings 31A and 31B is placed by being in contact with each other, the extension line Lb of the line connecting the radial direction end point b of the osculating ellipse C inside the outer ring raceway groove 32a from the ball center O of the ball bearing 31A passes through the inner diameter side than the axial direction end plane 32e of the outer ring 32 of the ball bearing 31B. The extension line La of the line connecting the radial direction end point a of the osculating ellipse C inside the inner ring raceway groove 33a from the ball center O of the ball bearing 31B passes through the outer diameter side than the axial direction end plane 33e of the inner ring 33 of the ball bearing 31A. As a result, in the respective ball bearings 31A, 31B and 31C, the contact angle α is set to be large so as to largely undertake the load in the axial direction.

In addition, between the outer rings 32 and between 33 of two rows of the angular contact ball bearings 31A and 31B in tandem duplex, an outer ring spacer 42 and an inner ring spacer 43 are respectively placed. Then, the extension lines La and Lb of each line connecting the radial direction bilateral end points a and b of the osculating ellipse C inside the outer ring raceway groove 32a from the ball center O of the left side ball bearing 31A passes through the axial direction end plane 42a of the outer ring spacer 42. In addition, the extension lines La and Lb of each line connecting the radial direction bilateral end points a and b of the osculating ellipse C inside the inner ring raceway groove 33a from the ball center O of the right side ball bearing 31B pass through the axial direction end plane 43a of the inner ring spacer 43. In the present embodiment, in order to satisfy the requisites, the inner diameter dimension of the outer ring spacer 42 and the outer diameter dimension of the inner ring spacer 43 are set.

For example, such as illustrated in FIG. 15, in a case of the ball bearings 31A and 31B having the inner diameter d of 50 mm, the outer diameter D of 110 mm, the width B of 27 mm, the contact angle α of 60°, the ball diameter Da of 20.638 mm, and the inclined angle β of the counterbore 32d of 5°, when the ball bearings 31A and 31B are placed in order for the axial direction end planes opposing each other to be in contact with each other, at least one side of the extension lines La and Lb of each line connecting the radial direction bilateral end points a and b of the osculating ellipse C inside the outer ring raceway groove 32a from the ball center O of the left side ball bearing 31A does not cross to the axial direction end plane 32e of the outer ring 32 of the right side ball bearing 31B, and at least one side of the extension lines La and Lb of each line connecting the radial direction bilateral end points a and b of the osculating ellipse C inside the inner ring raceway groove 33a from the ball center O of the right side ball bearing 31B does not cross to the axial direction end plane 33e of the inner ring 33 of the left side ball bearing 31A. However, as in the present embodiment, by providing the outer ring spacer 42 and the inner ring spacer 43 of the width 5 mm, the extension lines La and Lb of each line connecting the radial direction bilateral end points a and b of the osculating ellipse C inside the outer ring raceway groove 32a from the ball center O of the left side ball bearing 31A pass through the axial direction end plane 42a of the outer ring spacer 42, and the extension lines La and Lb of each line connecting the radial direction bilateral end points a and b of the osculating ellipse C inside the inner ring raceway groove 33a from the ball center O of the right side ball bearing 31B pass through the axial direction end plane 43a of the inner ring spacer 43.

Through satisfying the above described requisites in this manner, when an extremely large thrust load is applied to the multiple row combination ball bearing 30, the load in the contact angle direction generated at the contact portion between the ball 34 and the raceway grooves 32a and 33a of the inner and outer rings 32 and 33 is not undertaken only by the inner and outer rings 32 and 33 of the ball bearing 31A and 31B. Thus, the load may be backed up by the outer ring spacer 42 and the inner ring spacer 43. As a result, in addition to the outer ring spacer 42 and the inner ring spacer 41, bending stress acting on the inner and outer rings of the ball bearings 31A and 31B is substantially reduced and thereby a malfunction such as damage and fracture of the bearing ring may be prevented. Accordingly, as the multiple row combination ball bearing, a load bearing threshold value may be also increased.

Furthermore, when increasing the width of the outer ring spacer 42 and the inner ring spacer 43, the extension lines La and Lb of each line connecting the radial direction bilateral end points a and b of the osculating ellipse C inside the outer ring raceway groove 32a or the inner ring raceway groove 33a from the ball center O do not pass through the inside of the axial direction end plane of the adjacent ball bearings 31B and 31A, and comes to cross to the inner circumferential surface of a housing or the outer circumferential surface of the axis. However, in this case, the load may be backed up by these members. To increase the width of the outer ring spacer 42 and the inner ring spacer 43 does not cause a problem especially in terms of bearing the load.

The other configuration and operation are the same as the third embodiment.

Figure 16:
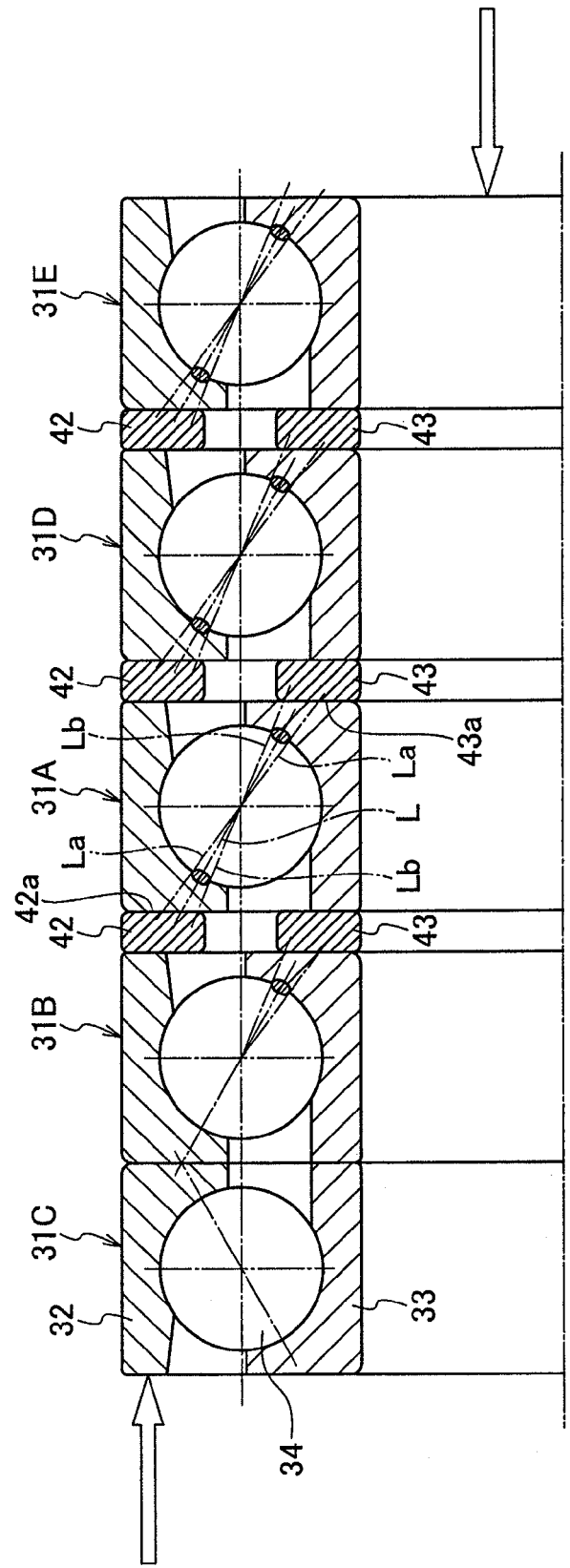
FIG. 16 is a cross sectional view illustrating a modification example of a multiple row combination ball bearing of a fourth embodiment.

In addition, the multiple row combination ball bearing 30 of the fourth embodiment may also be adaptable to four or five rows of the multiple row combination of the ball bearing 31A to 31E, as illustrated in FIG. 16, so as to undertake a large load in one direction.

In other words, four rows of the ball bearings 31B, 31A, 31D and 31E are respectively placed in tandem duplex via the outer ring spacer 42 and the inner ring spacer 43. For example, the extension lines La and Lb of each line connecting the radial direction bilateral end points a and b of the osculating ellipse C of the outer ring raceway groove 32a from the ball center O of the ball bearing 31A located intermediately in the axial direction pass through the axial direction end plane 42a of the outer ring spacer 42 which is adjacent at one side in the axial direction. In addition, the extension lines La and Lb of each line connecting the radial direction bilateral end points a and b of the osculating ellipse C of the inner ring raceway groove 33a from the ball center O of the ball bearing 31A pass through the axial direction end plane 43a of the inner ring spacer 43 which is adjacent at the other side in the axial direction.

Furthermore, the present invention is not limited to the above described embodiments and may be appropriately changed or improved.

In the above described embodiments, the counterbore is provided at the outer ring side, but the counterbore may be provided at the inner ring side. Also in that case, by appropriately setting the inclined angle of the counterbore of the inner ring 13, the same effect as the respective embodiments may be obtained.

The present invention is described in detail and additionally with reference to the specific embodiments. However, it is obvious to those skilled in the art that various changes and modifications may be made without departing from the spirit and scope of the present invention.

The present invention is based on Japanese Patent Application No. 2011-040056 filed on Feb. 25, 2011, Japanese Patent Application No. 2011-040057 filed on Feb. 25, 2011, Japanese Patent Application No. 2011-129271 filed on Jun. 9, 2011 and Japanese Patent Application No. 2011-129272 filed on Jun. 9, 2011, the contents of which are incorporated herein by reference.

The invention claimed is:

1. A multiple row combination ball bearing, comprising:
   at least two rows of ball bearings arranged in a parallel combination, the at least two rows of ball bearings including a first ball bearing and a second ball bearing arranged adjacent to each other in an axial direction,
   wherein each of the ball bearings comprises an outer ring and an inner ring,
   wherein the outer ring comprises a first outer ring groove shoulder, a second outer ring groove shoulder having a smaller radial thickness than the first outer ring groove shoulder, and an outer ring raceway groove provided between the first and second outer ring groove shoulders,
   wherein the inner ring comprises a first inner ring groove shoulder, a second inner ring groove shoulder having a smaller radial thickness than the first inner ring groove shoulder, and an inner ring raceway groove provided between the first and second inner ring groove shoulders,
   wherein an extension line of a contact angle of the first ball bearing passes through an axial direction end plane of the second outer ring groove shoulder of the second ball bearing, and an extension line of the contact angle of the second ball bearing passes through an axial direction end plane of the second inner ring groove shoulder of the first ball bearing, the second outer ring groove shoulder of the second ball bearing forming a counterbore having an inclination angle of 3° to 15° with respect to the axial direction,
   wherein the first and second ball bearings are arranged in tandem, and
   wherein the extension lines of the first and second ball bearings extend in substantially the same direction.

2. The multiple row combination ball bearing according to claim 1,
   wherein said at least two rows of the ball bearings further comprises a third ball bearing arranged adjacent to the second ball bearing such that the second ball bearing is arranged between the first and third ball bearings in the axial direction, and
   wherein the extension line of the contact angle of the second ball bearing passes through an axial direction end plane of one of the first and second outer ring groove shoulders of the third ball bearing that is adjacent to the first outer ring groove shoulder of the second ball bearing.

3. A multiple row combination ball bearing comprising:
   at least two rows of ball bearings arranged in a parallel combination, the at least two rows of ball bearings including a first ball bearing and a second ball bearing arranged adjacent to each other in an axial direction,
   wherein each of the ball bearings comprises an outer ring and an inner ring,
   wherein the outer ring comprises a first outer ring groove shoulder, a second outer ring groove shoulder having a smaller radial thickness than the first outer ring groove shoulder, and an outer ring raceway groove provided between the first and second outer ring groove shoulders,
   wherein the inner ring comprises a first inner ring groove shoulder, a second inner ring groove shoulder having a smaller radial thickness than the first inner ring groove shoulder, and an inner ring raceway groove provided between the first and second inner ring groove shoulders,
   wherein extension lines passing through radial direction bilateral end points of an osculating ellipse inside the outer ring raceway groove of the first ball bearing and a ball center of the first ball bearing respectively pass through an outer circumferential surface of the outer ring of the first ball bearing and an axial direction end plane of the second outer ring groove shoulder of the second ball bearing,
   wherein extension lines passing through radial direction bilateral end points of an osculating ellipse inside the inner ring raceway groove of the second ball bearing and a ball center of the second ball bearing respectively pass through an inner circumferential surface of the inner ring of the second ball bearing and an axial direction end plane of the second inner ring groove shoulder of the first ball bearing,
   the second outer ring groove shoulder of the second ball bearing forms a counterbore having an inclination angle of 3° to 15° with respect to the axial direction,
   wherein the first and second ball bearings are arranged in tandem, and
   wherein the extension lines of the first and second bearings extending in substantially the same direction.

4. The multiple row combination ball bearing according to claim 3,
wherein said at least two rows of the ball bearings further comprises a third ball bearing arranged adjacent to the second ball bearing such that the second ball bearing is arranged between the first and third ball bearings in the axial direction, and
wherein extension lines passing through radial direction bilateral end points of an osculating ellipse inside the outer ring raceway groove of the second ball bearing and the ball center of the second ball bearing respectively pass through an outer circumferential surface of the outer ring of the second ball bearing and an axial direction end plane of one of the first and second outer ring groove shoulders of the third ball bearing that is adjacent to the first outer ring groove shoulder of the second ball bearing.

5. A multiple row combination ball bearing comprising:
at least two rows of ball bearings arranged in a parallel combination, the at least two rows of ball bearings including a first ball bearing and a second ball bearing arranged adjacent to each other in an axial direction; and
an inner ring spacer and an outer ring spacer provided between the first and second ball bearings,
wherein each of the ball bearings comprises an outer ring and an inner ring,
wherein the outer ring comprises a first outer ring groove shoulder, a second outer ring groove shoulder having a smaller radial thickness than the first outer ring groove shoulder, and an outer ring raceway groove provided between the first and second outer ring groove shoulders,
wherein the inner ring comprises a first inner ring groove shoulder, a second inner ring groove shoulder having a smaller radial thickness than the first inner ring groove shoulder, and an inner ring raceway groove provided between the first and second inner ring groove shoulders,
wherein an extension line of a contact angle of first ball bearing passes through an axial direction end plane of the outer ring spacer provided adjacent to the second outer ring groove shoulder of the second ball bearing and an axial direction end plane of the second outer ring groove shoulder of the second hail bearing, and an extension line of a contact angle of the second ball bearing passes through an axial direction end plane of the inner ring spacer provided adjacent to the second inner ring groove shoulder of the first ball bearing and an axial direction end plane of the second inner ring groove shoulder of the first ball hearing,
wherein the first and second ball bearings are arranged in tandem, and
wherein the extension lines of the first and second bearings extend in substantially the same direction.

6. The multiple row combination ball bearing according to claim 5, further comprising another outer ring spacer and another inner ring spacer,
wherein said at least two rows of the ball bearings further comprises a third ball bearing arranged adjacent to the second ball bearing such that the other outer ring spacer and the other inner ring spacer are provided between the second and third ball bearings and such that the second ball bearing is arranged between the first and third ball bearings in the axial direction,
wherein the extension line of the contact angle of the second ball bearing passes through an axial direction end plane of the other outer ring spacer which is adjacent to the second outer ring groove shoulder of the third ball bearing.

7. A multiple row combination ball bearing comprising:
at least two rows of ball bearings arranged in a parallel combination, the at least two rows of ball bearings including a first ball bearing and a second ball bearing arranged adjacent to each other in an axial direction; and
an outer ring spacer and an inner ring spacer are provided between the first and second ball bearings,
wherein each of the ball bearings comprises an outer ring and an inner ring,
wherein the outer ring comprises a first outer ring groove shoulder, a second outer ring groove shoulder having a smaller radial thickness than the first outer ring groove shoulder, and an outer ring raceway groove provided between the first and second outer ring groove shoulders,
wherein the inner ring comprises a first inner ring groove shoulder, a second inner ring groove shoulder having a smaller radial thickness than the first inner ring groove shoulder, and an inner ring raceway groove provided between the first and second inner ring groove shoulders,
wherein extension lines passing through radial direction bilateral end points of an osculating ellipse inside the outer ring raceway groove of the first ball bearing and a ball center of the first ball bearing pass through an axial direction end plane of the outer ring spacer and an axial direction end plane of the second outer ring groove shoulder of the second ball bearing, the outer ring spacer being provided adjacent to the second outer ring groove shoulder of the second ball bearing, and extension lines connecting the radial direction bilateral end points of an osculating ellipse inside the inner ring raceway groove of the second ball bearing and a ball center of the second ball bearing pass through an axial direction end plane of the inner ring spacer and an axial direction end plane of the second inner ring groove shoulder of the first ball bearing, the inner ring spacer being provided adjacent to the second inner ring groove shoulder of the first ball bearing, and
wherein the extension lines of the first and second bearings extend in substantially the same direction.

8. The multiple row combination ball bearing according to claim 7, further comprising another outer ring spacer and another inner ring spacer,
wherein said at least two rows of the ball bearing further comprises a third ball bearing arranged adjacent to the second ball bearing such that the other outer ring spacer and the other inner ring spacer are provided between the second and third ball bearings and such that the second ball bearing is arranged between the first and third ball bearings in the axial direction, and
wherein extension lines connecting radial direction bilateral end points of an osculating ellipse inside the outer ring raceway groove of the second ball bearing and a ball center of the second ball bearing pass through an axial direction end plane of the other outer ring spacer which is adjacent to the second outer ring groove shoulder of the third ball bearing.

* * * * *